United States Patent
Camozzi et al.

(10) Patent No.: US 12,436,001 B2
(45) Date of Patent: Oct. 7, 2025

(54) METHOD AND SYSTEM FOR INTERROGATING AN OPTICAL FIBER SENSOR OF THE FIBER BRAGG GRATING TYPE, USING A TUNABLE OPTICAL BANDPASS FILTER

(71) Applicant: BREMBO S.p.A., Curno (IT)

(72) Inventors: Francesco Camozzi, Curno (IT); Beniamin Szewczyk, Curno (IT); Stefano Faralli, Curno (IT); Fabrizio Di Pasquale, Curno (IT); Tiziano Nannipieri, Curno (IT)

(73) Assignee: Brembo S.p.A., Bergamo (IT)

( * ) Notice: Subject to any disclaimer, the term of this patent is extended or adjusted under 35 U.S.C. 154(b) by 362 days.

(21) Appl. No.: 17/635,053

(22) PCT Filed: Aug. 6, 2020

(86) PCT No.: PCT/IB2020/057443
§ 371 (c)(1),
(2) Date: Feb. 14, 2022

(87) PCT Pub. No.: WO2021/028794
PCT Pub. Date: Feb. 18, 2021

(65) Prior Publication Data
US 2022/0291024 A1    Sep. 15, 2022

(30) Foreign Application Priority Data
Aug. 14, 2019  (IT) .................. 102019000014790

(51) Int. Cl.
*G01D 5/353*   (2006.01)
*G01L 1/24*    (2006.01)

(52) U.S. Cl.
CPC ..... *G01D 5/35316* (2013.01); *G01D 5/35387* (2013.01); *G01L 1/246* (2013.01)

(58) Field of Classification Search
CPC . G01D 5/35316; G01D 5/35387; G01L 1/246
See application file for complete search history.

(56) References Cited

U.S. PATENT DOCUMENTS 5,838,437 A * 11/1998 Miller .................. G02B 6/4246
356/478
7,292,751 B2 * 11/2007 Popovic ............. G02B 6/29343
359/278

(Continued)

FOREIGN PATENT DOCUMENTS

CN    101907722 A * 12/2010
CN    108645534 B * 5/2020 ............. G01K 11/32

(Continued)

OTHER PUBLICATIONS

Gao et al., The prediction of braking noise in regenerative braking system using closed-loop coupling disk brake model, Proceedings of the Institution of Mechanical Engineers, Part D: Journal of Automobile Engineering 2019 233:14, 3721-3735 (Year: 2019).*

(Continued)

*Primary Examiner* — Peter Radkowski
(74) *Attorney, Agent, or Firm* — Marshall & Melhorn, LLC

(57) ABSTRACT

A method for interrogating an FBG sensor includes lighting the FBG sensor with a broadband excitation optical radiation, conveying the optical spectrum transmitted or reflected by the FBG sensor to a tunable optical BPF having a first extraction port and a second transmission port, tuning the optical BPF at a constant operating wavelength, depending on nominal operating wavelength of the FBG sensor, detecting a first optical signal exiting the first extraction port, converting, by a first opto-electronic receiver, the first optical signal into a first electrical signal, representative of a wavelength shift of the spectrum transmitted or reflected by the FBG sensor, detecting a second optical signal exiting the (Continued)

second transmission port, converting the second optical signal, by a second opto-electronic receiver, into a second electrical signal, representative of an optical reference power, and determining the wavelength shift of the spectrum transmitted or reflected by FBG sensor, based on detected first and second electrical signals. A system for interrogating an FBG sensor is also provided.

22 Claims, 9 Drawing Sheets

(56) References Cited

U.S. PATENT DOCUMENTS

| | | | | |
|---|---|---|---|---|
| 7,343,067 | B2* | 3/2008 | Barwicz | G02B 6/29361 385/32 |
| 7,424,181 | B2* | 9/2008 | Haus | H04J 14/0206 385/16 |
| 7,450,800 | B2* | 11/2008 | Barwicz | G02B 6/29343 385/32 |
| 7,480,460 | B2* | 1/2009 | Colpitts | G01D 5/35364 374/E11.015 |
| 7,539,375 | B2* | 5/2009 | Popovic | G02B 6/12007 385/32 |
| 7,853,108 | B2* | 12/2010 | Popovic | G02B 6/12007 385/132 |
| 8,032,027 | B2* | 10/2011 | Popovic | H04J 14/0204 398/85 |
| 8,068,706 | B2* | 11/2011 | Popovic | G02B 6/12007 385/28 |
| 8,111,994 | B2* | 2/2012 | Popovic | H04J 14/021 398/79 |
| 8,340,478 | B2* | 12/2012 | Popovic | G02B 6/12007 385/32 |
| 8,483,521 | B2* | 7/2013 | Popovic | G02B 6/29338 385/5 |
| 8,655,114 | B2* | 2/2014 | Popovic | G02F 1/3132 385/32 |
| 8,670,476 | B2* | 3/2014 | Goddard | H01S 5/142 372/64 |
| 8,800,391 | B2* | 8/2014 | Zhang | G01L 1/18 73/862.632 |
| 9,537,571 | B2* | 1/2017 | Li | H04L 7/0091 |
| 9,595,918 | B2* | 3/2017 | Li | H03B 17/00 |
| 9,677,957 | B2* | 6/2017 | Dong | G01L 1/246 |
| 10,001,362 | B2* | 6/2018 | Ronnekleiv | G01D 5/3539 |
| 10,135,218 | B2* | 11/2018 | Popovic | H01S 3/08086 |
| 10,185,205 | B2* | 1/2019 | Popovic | G02F 1/0118 |
| 10,234,346 | B2* | 3/2019 | Dong | E21B 47/135 |
| 10,247,880 | B2* | 4/2019 | Docter | G01B 11/168 |
| 10,581,215 | B2* | 3/2020 | Popovic | H04J 14/02 |
| 10,996,538 | B2* | 5/2021 | Popovic | G02B 6/29338 |
| 2005/0275921 | A1* | 12/2005 | Haus | G02B 6/3536 359/247 |
| 2006/0159392 | A1* | 7/2006 | Popovic | G02B 6/29383 385/27 |
| 2006/0197959 | A1* | 9/2006 | Barwicz | G01C 19/66 356/470 |
| 2006/0245693 | A1* | 11/2006 | Barwicz | G02B 6/29361 385/39 |
| 2006/0285850 | A1* | 12/2006 | Colpitts | G01D 5/35364 374/E11.015 |
| 2008/0044184 | A1* | 2/2008 | Popovic | H04J 14/0206 398/82 |
| 2008/0166095 | A1* | 7/2008 | Popovic | G02B 6/12007 385/15 |
| 2008/0178691 | A1* | 7/2008 | Zhang | G01L 1/2231 73/862.632 |
| 2008/0273835 | A1* | 11/2008 | Popovic | G02B 6/12007 385/27 |
| 2009/0220228 | A1* | 9/2009 | Popovic | G02B 6/29343 398/48 |
| 2009/0290835 | A1* | 11/2009 | Popovic | G02B 6/12007 385/32 |
| 2010/0158429 | A1* | 6/2010 | Popovic | G02F 1/225 385/2 |
| 2010/0209038 | A1* | 8/2010 | Popovic | G02F 1/3133 385/27 |
| 2010/0303122 | A1* | 12/2010 | Popovic | G02F 1/011 359/290 |
| 2011/0026879 | A1* | 2/2011 | Popovic | G02B 6/1223 385/28 |
| 2012/0063484 | A1* | 3/2012 | Goddard | G02B 6/124 264/293 |
| 2012/0128350 | A1* | 5/2012 | Popovic | H04J 14/0206 398/25 |
| 2014/0152995 | A1* | 6/2014 | Dong | G01D 5/35316 356/477 |
| 2014/0158871 | A1* | 6/2014 | Wong | G01N 21/7746 250/227.14 |
| 2014/0193155 | A1* | 7/2014 | Popovic | H04J 14/02 29/428 |
| 2015/0100279 | A1* | 4/2015 | Ronnekleiv | G01D 5/3539 702/194 |
| 2016/0139487 | A1* | 5/2016 | Popovic | G02B 6/29395 385/2 |
| 2017/0075064 | A1* | 3/2017 | Docter | G02B 6/12033 |
| 2017/0098917 | A1* | 4/2017 | Popovic | H04B 10/40 |
| 2017/0248480 | A1* | 8/2017 | Dong | G01D 5/35316 |
| 2017/0315421 | A1* | 11/2017 | Popovic | G02F 1/025 |
| 2018/0019820 | A1* | 1/2018 | Sun | H04J 14/02 |
| 2019/0089461 | A1* | 3/2019 | Sun | H04B 10/506 |
| 2021/0373413 | A1* | 12/2021 | Popovic | G02B 6/29395 |

FOREIGN PATENT DOCUMENTS

| | | | | |
|---|---|---|---|---|
| EP | 1890123 | A2 | 2/2008 | |
| GB | 2419184 | A | 4/2006 | |
| KR | 20130128873 | A * | 5/2012 | |
| WO | 2008028138 | A2 | 3/2008 | |
| WO | WO-2008071578 | A1 * | 6/2008 | B60T 8/171 |
| WO | WO-2014195483 | A2 * | 12/2014 | B29C 70/845 |

OTHER PUBLICATIONS

Major et al., Fibre Bragg grating sensors for the analysis of pressure distribution at a disc brake/pad interface, 2017 25th Optical Fiber Sensors Conference (OFS), Jeju, Korea (South), 2017, pp. 1-4, doi: 10.1117/12.2263455. (Year: 2017).*
English language translation of WO-2008071578-A1 (Year: 2008).*
English language translation of CN-101907722-A (Year: 2010).*
English language translation of KR-20130128873-A (Year: 2012).*
English language translation of WO-2014195483-A2 (Year: 2014).*
English language translation of CN-108645534-B (Year: 2020).*
Kim et al., Multi-point interrogation of FBG sensors using cascaded flexible wavelength-division Sagnac loop filters, Opt. Express 14, 8546-8551 (2006) (Year: 2006).*
European Patent Office, International Search Report, issued in PCT/IB2020/057443, Oct. 30, 2020, Rijswijk, NL.
Lukosz W. et al., Integrated optical nanomechanical devices as modulators, switches, and tunable frequency filters, and as acoustical sensors, Integrated Optics and Microstructures, Mar. 2, 1993, pp. 214-234, vol. 1793, Proc. SPIE, US, Event: Fibers '92, 1992, Boston, MA, US.
Marin Yisbel Eloisa et al., Current Status and Future Trends of Photonic-Integrated FBG Interrogators, Journal of Lightwave Technology, Feb. 15, 2018, pp. 946-953, vol. 36, No. 4, IEEE, US.
Manganelli et al., Low-Power-Consumption Integrated Tunable Filters for WDM Switching Applications in Silicon Photonics, IEEE Photonics Technology Letters, Sep. 15, 2018, pp. 1601-1604, vol. 30, No. 18, IEEE, US.
P. Pintus et al., Broadband TE Optical Isolators and Circulators in Silicon Photonics Through CE: YIG Bonding, Journal of Lightwave Technology, Mar. 1, 2019, pp. 1463-1473 vol. 37, No. 5, IEEE, US.
M. N. Sysak et al., Hybrid Silicon Laser Technology: A Thermal

(56) References Cited

OTHER PUBLICATIONS

Perspective, IEEE Journal of Selected Topics in Quantum Electronics, Nov.-Dec. 2011, pp. 1490-1498, vol. 17, No. 6, IEEE, US.

* cited by examiner

METHOD AND SYSTEM FOR INTERROGATING AN OPTICAL FIBER SENSOR OF THE FIBER BRAGG GRATING TYPE, USING A TUNABLE OPTICAL BANDPASS FILTER

CROSS-REFERENCE TO RELATED APPLICATIONS

This application is a National Phase Application of PCT International Application No. PCT/IB2020/057443, having an International Filing Date of Aug. 6, 2020 which claims priority to Italian Application No. 102019000014790 filed Aug. 14, 2019, each of which is hereby incorporated by reference in its entirety.

FIELD OF THE INVENTION

The invention relates, in general, to a method and system for measuring physical parameters by means of the use of optical fiber sensors of the Fiber Bragg Grating type.

More specifically, the present invention relates to a method and system for interrogating an optical fiber sensor of the Fiber Bragg Grating type, using a tunable optical bandpass filter.

BACKGROUND ART

Optical fiber sensors of the Fiber Bragg Grating type (FBG sensors) are becoming more and more frequently used for measuring physical magnitudes, such as strain or temperature, by virtue of the properties of simplicity and precision. Such sensors are passive, meaning that they need to be lit by an optical radiation and the spectrum reflected or transmitted thereby must be analyzed in order to obtain the measurement of the desired physical magnitude.

In fact, since the variation in the detected physical magnitudes causes a shift of the spectrum and/or of the reflected peak wavelength of the FBG sensor, in the most common known solutions, it is necessary to scan a certain range of wavelengths to determine the result.

Typically, in known solutions, this can be done in two alternative ways: lighting by means of an optical source that is wavelength-tunable (for example, tunable lasers), and broadband reception; or, broadband lighting and reception by means of an electrically or optically tunable receiver (for example, Arrayed WaveGuide Grating, AWG, or spectrometer).

In other words, either at the transmission or at the reception side there must be a tunable device, which for each interrogation/query of the FBG sensor, must implement a scan on a wavelength, by sequentially optically or electrically tuning on a certain number of operating wavelengths belonging to a certain range.

This results in notable drawbacks, related to both the complexity of the devices requested (for example, lasers tunable on transmission, or spectrometers on reception), and problems of slow responses or limited dynamics, due to the timeframe of the sequential tuning on a range of wavelengths, which can also be large.

One possible evolution, at the reception side, can derive from the use of tunable optical filters (for example, microring resonator filters, e.g., in the variants comprising one or two rings for each single filter). However, such solutions also suffer from relatively slow dynamics, since the operation of such systems includes tuning the tunable optical filter by means of a continuous scan, carried out periodically, of the spectrum of the FBG sensor, around the central wavelength, to identify the peak of the spectrum of the FBG sensor. Thus, the dynamic performance of such a device depends on the scanning speed of the resonance wavelength of the micro-ring, which is relatively slow.

Another problem emerging in this solution (as in the other previously mentioned known solutions) derives from the effects of the spurious power variations due to laser emission power variations and spurious variable losses of the optical path covered by the optical beams.

In the light of the above, the need is strongly felt for systems and methods for interrogating FBG sensors, obtained in integrated optics, which are able to mitigate the aforesaid technical problems, and satisfy the following criteria: (i) a compact and simple structure and compact and simple use; (ii) improved dynamic performance, with quicker responses; (iii) greater immunity to spurious losses and/or fluctuations of the optical lighting power (iv) low cost; (v) robustness to hostile environments.

Such needs are felt for methods of interrogating FBG sensors used in a wide range of applications, including the important field of application for measurements carried out in pads and calipers of a braking system.

As already noted, the above needs are not fully met by the solutions currently offered by the prior art.

SOLUTION

It is an object of the present invention to provide a method for interrogating an optical fiber sensor of the Fiber Bragg Grating type, using a tunable optical bandpass filter, which allows to at least partially overcome the above drawbacks with reference to the prior art, and to meet the above needs particularly felt in the technical field in hand.

These and other objects are achieved by a method for interrogating an optical fiber sensor of the Fiber Bragg Grating type, using a tunable optical bandpass filter as described and claimed herein.

Some advantageous embodiments of such method are also described.

It is also the object of the present invention to provide a corresponding system for interrogating an optical fiber sensor of the Fiber Bragg Grating type, using a tunable optical bandpass filter.

This object is achieved by a system for interrogating an optical fiber sensor of fiber Bragg grating type as described and claimed herein.

Some advantageous embodiments of such system are also described.

BRIEF DESCRIPTION OF THE DRAWINGS

Further features and advantages of the method and system according to the invention will become apparent from the description below of preferred embodiments thereof, provided by way of non-limiting explanation, with reference to the accompanying drawings, in which.

DETAILED DESCRIPTION OF THE INVENTION

Figure 1:
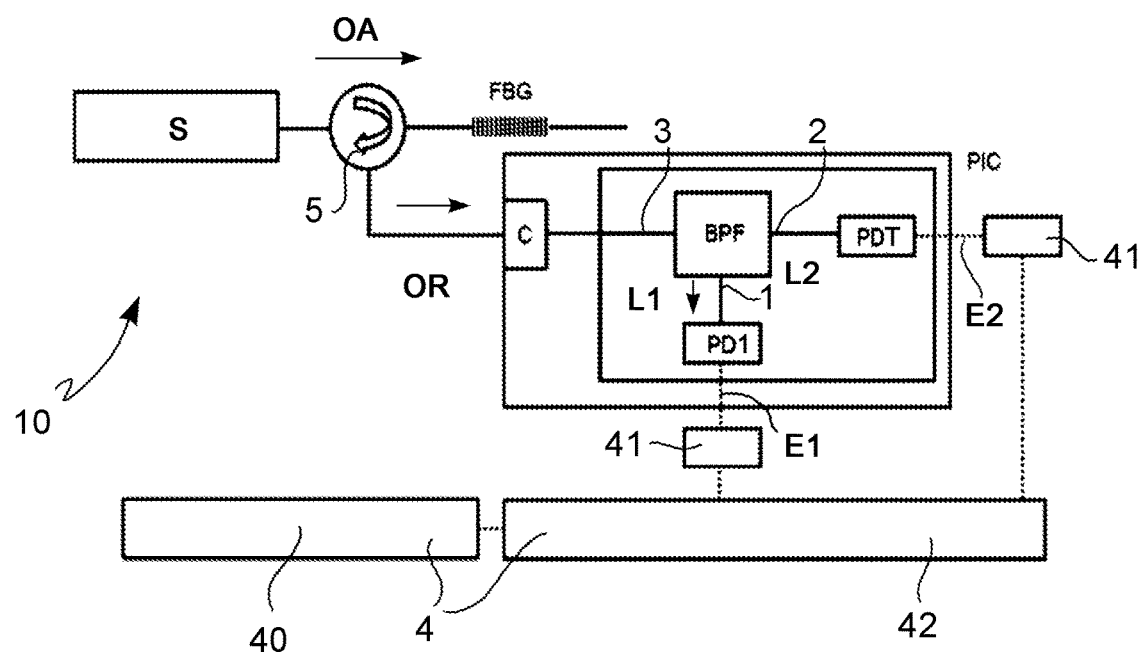
FIGS. 1-5 show, by means of functional block diagrams, respective different embodiments of a system for interrogating an optical fiber sensor of the Fiber Bragg Grating type according to the present invention.

A method for interrogating at least one optical fiber sensor of the Fiber Bragg Grating type FBG (also referred to as "FBG sensor", for brevity, below) is now described with reference to FIGS. 1-14.

The method comprises, first of all, the steps of lighting the aforesaid at least one optical fiber sensor of the Fiber Bragg Grating type FBG with a broadband excitation optical radiation OA, and conveying the optical spectrum transmitted OT or the optical spectrum reflected OR by the at least one optical fiber sensor of the Fiber Bragg Grating type FBG to at least one tunable optical bandpass filter BPF, having a first extraction port 1 and a second transmission port 2, which are complementary to each other.

The method also includes tuning the optical bandpass filter BPF at a constant operating wavelength $\lambda i$, depending on the nominal operating wavelength of the fiber Bragg grating of the optical fiber sensor FBG.

The method then comprises the step of detecting a respective first optical signal L1 exiting the first extraction port 1 of the optical bandpass filter. Such a first optical signal is a narrow-band optical filtering of the transmission spectrum OT or reflection spectrum OR of the fiber Bragg grating of the optical fiber sensor FBG around the constant operating wavelength $\lambda i$ of the optical bandpass filter BPF.

The method then provides converting, by means of a first opto-electronic receiver PD1, the aforesaid first optical signal L1 into a respective first electrical signal E1, representative of a wavelength shift $\Delta\lambda$, with respect to the nominal operating wavelength, of the spectrum reflected or transmitted by the Bragg grating of the optical fiber sensor FBG.

In different implementation options, this first electrical signal E1 can be an electric current or an electrical voltage.

In a preferred implementation option, the first electrical signal E1 is representative of (or corresponding to) an electrical voltage, proportional to the optical power incident on the first opto-electronic receiver PD1, and therefore, it is correlated (for example, proportional) to the aforesaid wavelength shift $\Delta\lambda$ of the spectrum reflected or transmitted by the optical fiber sensor FBG.

The method then comprises the steps of detecting a second optical signal L2, exiting the second transmission port 2 of the optical bandpass filter BPF, spectrally complementary to the first optical signal L1; and converting such a second optical signal L2, by means of a second opto-electronic receiver PDT, into a respective second electrical signal E2, representative of an optical reference power, which is substantially independent of the filtering wavelength, and having a dependence on the power of the broadband excitation optical radiation, and on the losses of the overall optical path, equal to the dependence undergone by the first optical signal.

In different implementation options, such a second electrical signal E2 can be an electric current or an electrical voltage.

In a preferred implementation option, the second electrical signal E2 is representative of (or corresponding to) an electrical voltage, proportional to the optical power incident on the second opto-electronic receiver PDT.

Finally, the method provides determining the wavelength shift $\Delta\lambda$, with respect to the nominal operating wavelength, of the spectrum reflected or transmitted by the Bragg grating of the optical fiber sensor FBG, based on the first electrical signal detected E1, deriving from the optical signal L1 exiting the first extraction port 1 of the optical bandpass filter BPF, and based on the second electrical signal E2, representative of the optical power of reference detected, deriving from the second optical signal L2 exiting the second transmission port 2 of the optical bandpass filter BPF, so that the detection of the first electrical signal is compensated for with respect to variations in power of broadband excitation optical radiation and variations in loss on the optical path.

The aforesaid wavelength shift $\Delta\lambda$ of the spectrum reflected OR or transmitted OT by the determined Bragg grating is representative of the physical magnitude measured by the optical fiber sensor FBG.

The aforesaid optical bandpass filter BPF and the aforesaid first opto-electronic receiver PD1 and second opto-electronic receiver PDT are integrated in a photonic integrated circuit (Photonic Integrated Circuit"—PIC).

In typical operating conditions, the optical bandpass filter BPF is designed to have a narrower bandwidth (typically much narrower) than the band of the transmitted or reflected spectrum of the FBG sensor, i.e., equivalently, an FBG sensor is selected with a much greater band than that of the optical bandpass filter (as shown in FIGS. 9-12). Due to this feature, the total optical power detected by the second transmission port of the filter remains practically constant in the detection range of the physical magnitude measured by the FBG sensor.

The tuning of the optical bandpass filter BPF is carried out during the initial setting, with the aim of opportunely positioning the resonance of the optical filter with respect to the spectrum of the FBG sensor (for example, but not necessarily, in the almost linear zone of the response of the FBG sensor, which will be better disclosed below).

After tuning, the optical bandpass filter BPF operates keeping the tuned wavelength constant, to filter the optical spectrum reflected or transmitted by the FBG sensor, at the determined wavelength $\lambda i$. The variations, i.e., the shifts $\Delta\lambda$, of the wavelength of the peak and of the entire optical spectrum reflected or transmitted by the FBG sensor, due to the physical phenomena that are desired to be measured, cause the part of the optical spectrum filtered by the optical bandpass filter to undergo consequent variations, and ultimately determine optical power variations at the output of the optical bandpass filter, correlated, in a known manner, to the wavelength shift/variation of the spectrum of the FBG sensor.

According to an embodiment of the method, the tunable optical bandpass filter BPF comprises a third input port 3, different from the aforesaid first extraction port 1 and second transmission port 2. In this case, the conveying step comprises conveying the optical spectrum transmitted OT or reflected OR by the at least one optical fiber sensor of the Fiber Bragg Grating type FBG to said third input port 3 of the tunable optical bandpass filter BPF.

According to one embodiment, the method uses, as an optical bandpass filter, an optical micro-ring resonator filter (i.e. "Micro-Ring Resonator MRR"), which will be disclosed in further detail in the following description of the system according to the invention.

According to an implementation option, illustrated below, the optical micro-ring resonator filter is of the single-ring type, and comprises one optical ring 8.

According to another implementation option, the optical micro-ring resonator filter is of the double-ring type, and comprises two optical rings (as shown, for example, in the scientific article "*Low-Power-Consumption Integrated Tunable Filters for WDM Switching Applications in Silicon Photonics*"—Manganelli et al.—IEEE Photonics Technology Letters, Vol. 30, No. 18, Sep. 15, 2018).

According to one embodiment, the method uses, as the first opto-electronic receiver PD1 and the second opto-electronic receiver PDT, a first and a second photodiode, respectively, shown in further detail in the following description of the system according to the invention.

According to a preferred embodiment, the aforesaid tuning step comprises tuning the optical bandpass filter BPF at a constant operating wavelength $\lambda i$ positioned on a linear or almost linear zone of the nominal reflection or transmission spectrum of the fiber Bragg grating of the optical fiber sensor FBG, in such a way that a shift or variation in the wavelength $\Delta\lambda$ of the reflection or transmission spectrum of such an optical fiber sensor of the Fiber Bragg Grating type FBG corresponds to a linear or almost linear variation in the power or intensity of the first optical signal. This situation is shown in FIGS. 9-12.

According to an implementation option, the method includes interrogating at least one optical fiber sensor of the Fiber Bragg Grating type having a reflection spectrum with a linear shape, for example, chirped Fiber Bragg Grating.

According to an embodiment, shown in FIG. 1, the method includes interrogating only one optical fiber sensor of the Fiber Bragg Grating type FBG, operating on the reflected spectrum OR of the FBG sensor.

Figure 2:
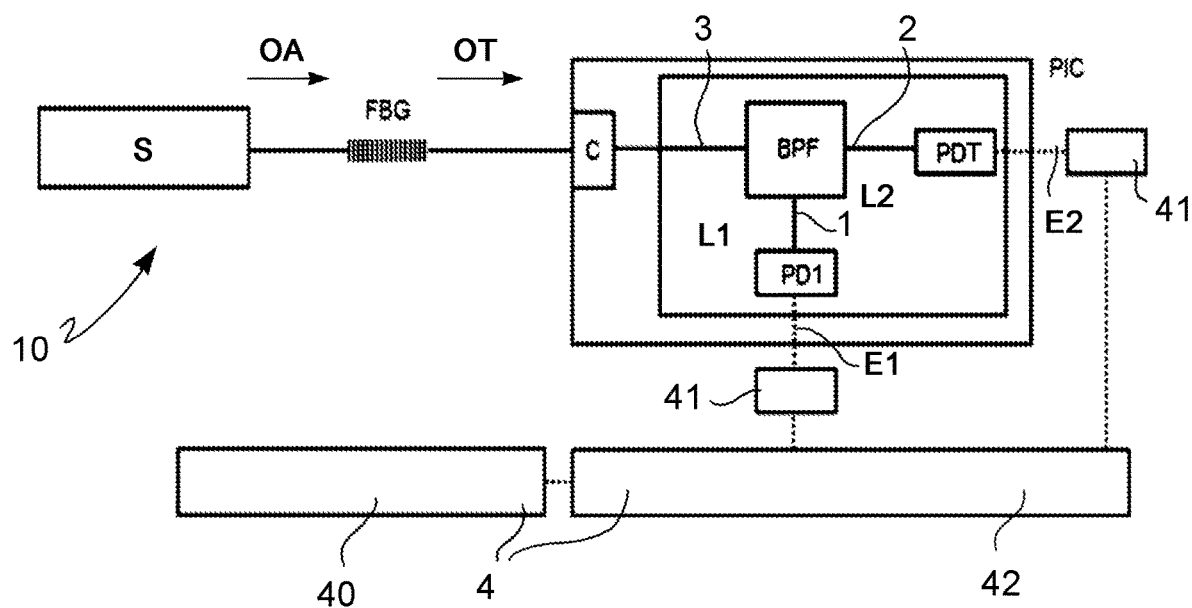

According to another embodiment, shown in FIG. 2, the method provides interrogating only one optical fiber sensor of the Fiber Bragg Grating type FBG, operating on the transmitted spectrum OT of the FBG sensor.

According to a further embodiment (shown in FIG. 3), the method includes interrogating a plurality of optical fiber sensors of the Fiber Bragg Grating type FBG1-FBGn in cascade, each characterized by a respective nominal operating wavelength $\lambda 1$-$\lambda n$.

In this case, the conveying step comprises conveying the entire optical spectrum transmitted OT or reflected OR by the cascade of optical fiber sensors of the Fiber Bragg Grating FBG1-FBGn type to a cascade of tunable optical bandpass filters BPF1-BPFn; and the tuning step comprises tuning each of the optical bandpass filters BPF1-BPFn around a respective wavelength $\lambda 1$-$\lambda n$ corresponding to a respective one of the nominal operating wavelengths of the optical fiber sensors of the Fiber Bragg Grating type FBG1-FBGn.

The step of detecting at least one first optical signal L1 comprises detecting a plurality of first optical signals L11-L1$n$ exiting the first extraction port of each of the optical bandpass filters BPF1-BPFn, each at the respective operating wavelength $\lambda 1$-$\lambda n$, which is kept constant; and the converting step comprises converting the plurality of first optical signals L11-L1$n$ into a respective plurality of first electrical signals E11-E1$n$, by means of a plurality of first opto-electronic receivers PD1-PDn (for example, comprising first photodiodes).

The step of detecting a second optical signal L2 comprises detecting an optical signal exiting the second transmission port 2 of the last optical bandpass filter (BPFn) of the cascade of optical bandpass filters; and the converting step comprises converting the aforesaid second optical signal L2 into a respective second electrical signal E2, by means of a second opto-electronic receiver PDT.

The determining step comprises determining the wavelength shift $\Delta\lambda i$, with respect to the nominal operating wavelength, of each of the spectra reflected OR or transmitted OT by each of the optical fiber sensors of the Fiber Bragg Grating type FBG1-FBGn, based on the plurality of first electrical signals detected E11-E1$n$, and on the second electrical signal detected E2.

According to another embodiment (shown in FIG. 4), the method includes interrogating only one optical fiber sensor of the Fiber Bragg Grating type FBG on a wide range of wavelengths.

In this case, the conveying step comprises conveying the optical spectrum transmitted OT or reflected OR by the optical fiber sensor of the Fiber Bragg Grating type FBG to a cascade of tunable optical bandpass filters BPF1-BPFn; and the tuning step comprises tuning each of the optical bandpass filters BPF1-BPFn at a respective operating wavelength $\lambda 1$-$\lambda n$, which is kept constant, belonging to the wide range of wavelengths of the aforesaid optical spectrum transmitted or reflected by the FBG sensor.

The step of detecting at least one first optical signal comprises detecting a plurality of first optical signals L11-L1$n$ exiting the first extraction port 1 of each of the optical bandpass filters BPF1-BPFn; and the step of converting the at least one first optical signal comprises converting the plurality of first optical signals L11-L1$n$ into a respective plurality of first electrical signals E11-E1$n$, by means of a plurality of first opto-electronic receivers PD1-PDn (for example, comprising first photodiodes).

The step of detecting a second optical signal L2 comprises detecting an optical signal exiting the second transmission port 2 of the last optical bandpass filter BPFn of the cascade of optical bandpass filters, and the step of converting the second optical signal L2 comprises converting this second optical signal into a respective second electrical signal E2, by means of a second opto-electronic receiver PDT.

The determining step comprises determining the peak of the reflection or transmission wavelength of the FBG sensor, within said wide range of wavelengths, based on the plurality of first electrical signals detected E11-E1$n$, and on the second electrical signal detected E2.

According to a preferred implementation option, each of the first electrical signals E1$i$ (belonging to the group E11-E1$n$) is representative of an electrical voltage, proportional to the optical power incident on a respective opto-electronic receiver Pd$i$ (belonging to the group of opto-electronic receivers PD1-PDn), and therefore, it is correlated (for example, proportional) to the respective wavelength shift ΔλI of the spectrum reflected or transmitted by the respective optical fiber sensor FBGi (belonging to the group of sensors FBG1-FBGn).

According to a further embodiment (shown in FIG. 5) the method further includes, before the conveying step, the step of splitting the total optical power, by means of an optical splitter D, and sending a part thereof to a third opto-electronic receiver PDD, to obtain a third electrical signal E3, adapted to support a further compensation.

As noted above (and as depicted in FIG. 6) the optical bandpass filter, for example the micro-ring resonator, allows to filter a part of the signal reflected (or transmitted) by the FBG sensor at the resonance frequency of the resonant ring on the extraction port 1 ("drop port") of the optical micro-ring filter; and also to obtain a transmitted spectrum (corresponding to the spectrum of the FBG sensor without the aforesaid filtered part) on the transmission port 2 ("through port") of the optical micro-ring filter.

In summary, as previously disclosed, the method is based on optical bandpass filters with two complementary ports, and on two photo-detectors, one for each of such complementary ports.

In particular, in one embodiment, one or more two-ports micro-ring resonators are used, for querying a single FBG sensor or a plurality of FBG sensors, with two photo-detectors, integrated for each micro-ring resonator, connected to the two "drop" and "through" output ports of the micro-ring resonator.

Again with reference to FIGS. 1-14, a system 10 is now described for interrogating at least one optical fiber sensor of the Fiber Bragg Grating FBG type.

Such a system comprises at least one optical fiber sensor of the Fiber Bragg Grating FBG type, a broadband optical radiation source S, at least one tunable optical bandpass filter BPF, a first opto-electronic receiver PD1, a second opto-electronic receiver PDT and electronic processing means 4.

The broadband optical radiation source S is configured to light the at least one optical fiber sensor of the Fiber Bragg Grating type FBG with a broadband excitation optical radiation OA.

According to different possible embodiments of the system, the broadband optical radiation source S can comprise a super-luminescent LED (SLED), or the spontaneous amplified emission (AE) of an erbium-doped optical amplifier (EDFA).

According to an implementation option, the broadband optical radiation source S is a component external to the photonic integrated circuit PIC, in which the optical bandpass filter BPF and the first opto-electronic receiver PD1 and second opto-electronic receiver PDT are integrated.

According to another implementation option (shown, for example, in FIG. 13), the broadband optical radiation source S is integrated in the photonic integrated circuit PIC, in which the optical bandpass filter BPF and the first opto-electronic receiver PD1 and second opto-electronic receiver PDT are integrated. To this end, appropriate integration technologies can be used, which are known per se, for example, based on semi-conductors from the group III-V and on Silicon-On-Insulator SOI technology (as shown, for example, in the scientific article "Hybrid Silicon Laser Technology: A Thermal Perspective"—M. N. Sysak et al.—IEEE Journal of Selected Topics in Quantum Electronics, Vol. 17, No. 6, November/December 2011).

The at least one tunable optical bandpass filter BPF comprises a first extraction port 1 and a second transmission port 2, which are complementary to each other, and it further comprises a third input port 3 (different from the aforesaid first extraction port 1 and second transmission port 2), which is operatively connected to the at least one optical fiber sensor of the Fiber Bragg Grating type FBG, to receive the optical spectrum transmitted OT or reflected OR by such a sensor, The optical bandpass filter BPF is tunable, in a range of wavelengths, at a constant operating wavelength λi, depending on the nominal operating wavelength of the fiber Bragg grating of the optical fiber sensor FBG.

The first opto-electronic receiver PD1 is operatively connected to the first extraction port 1 of the optical bandpass filter BPF to receive a respective first optical signal L1, and it is configured to convert such a first optical signal L1 into a respective first electrical signal E1. The aforesaid first optical signal is a narrow-band optical filtering of the transmission OT or reflection spectrum OR of the fiber Bragg grating of the optical fiber sensor FBG at the constant operating wavelength of the optical filter.

The second opto-electronic PDT receiver is operatively connected to the second transmission port 2 of the optical bandpass filter BPF to receive a second optical signal L2, and it is configured to convert said second optical signal L2 into a respective second electrical signal E2, representative of an optical reference power, which is substantially independent of the filtering wavelength, and having a dependence on the power of the broadband excitation optical radiation, and on the losses of the overall optical path, equal to the dependence undergone by the first optical signal.

The electronic processing means 4 are operatively connected to the aforesaid first opto-electronic receiver PD1 and second opto-electronic receiver PDT, and they are configured to determine a wavelength shift Δλ, with respect to the nominal operating wavelength, of the spectrum reflected OR or transmitted OT by the Bragg grating of the optical fiber sensor FBG, based on the first electrical signal detected E1, deriving from the first optical signal L1, and based on the second electrical signal E2, representative of the reference optical power detected, deriving from the second optical signal L2, so that the detection of the first electrical signal is compensated for with respect to variations in power of broadband excitation optical radiation and variations in loss on the optical path.

The aforesaid wavelength shift Δλ of the spectrum reflected or transmitted by the determined Bragg grating is representative of the physical magnitude measured by the optical fiber sensor FBG.

The aforesaid optical bandpass filter BPF and the aforesaid first opto-electronic receiver PD1 and second opto-electronic receiver PDT are integrated in a photonic integrated photonic circuit ("Photonic Integrated Circuit"—PIC).

According to different implementation options, such a first electrical signal E1 can be an electric current or an electrical voltage.

In a preferred implementation option, the first electrical signal E1 is representative of (or corresponds to) an electrical voltage, proportional to the optical power incident on the opto-electronic receiver, and therefore it is correlated (for example, proportional) to the aforesaid wavelength shift Δλ of the spectrum reflected or transmitted by the optical fiber sensor FBG.

According to an embodiment of the system, the aforesaid optical bandpass filter BPF is an optical micro-ring resonator filter (i.e. "Micro-Ring Resonator MRR").

As already previously disclosed, according to two possible implementation options, the optical micro-ring resonator filter is of the single-ring type, and comprises a single ring 8, or the optical micro-ring resonator filter is of the double-ring type, and comprises two optical rings.

The ring resonator is a structure, in which the optical wave guide or conductor is closed in a loop configuration: when the light, at the particular resonance wavelength, passes through the ring with constructive interference, the intensity of the light grows inside the ring and the light (at the resonance wavelength) can be extracted and seen from the extraction/monitoring port of the ring resonator filter.

Figure 6:
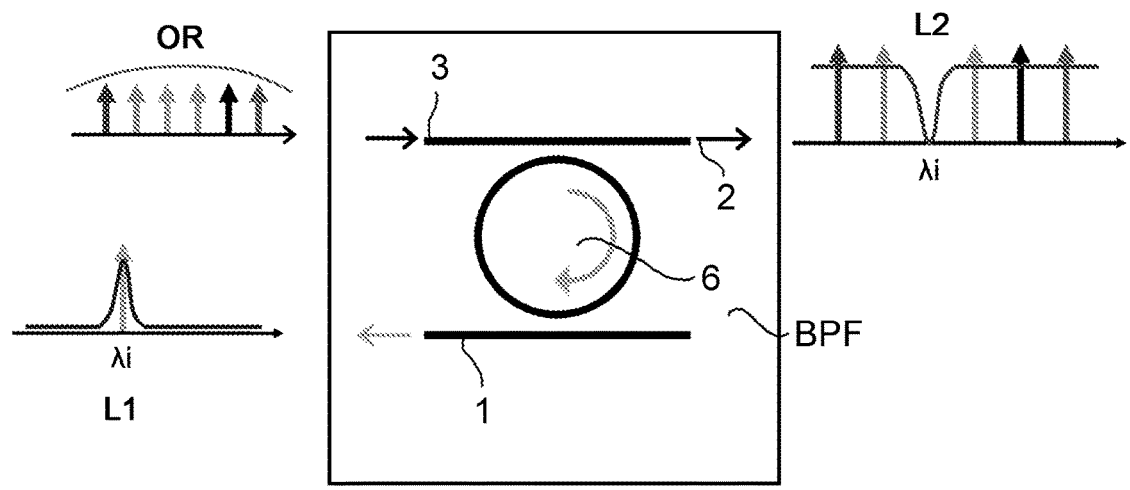
FIG. 6 shows a functional diagram of an optical bandpass filter comprised in an embodiment of the system according to the invention, and it further depicts an example of optical spectra entering the optical filter, exiting a first extraction port of the optical filter and exiting a second transmission port of the optical filter.

As shown in FIG. 6, after injecting a broadband input spectrum into the input port 3 of the micro-ring resonator 6, only the resonance wavelengths of the ring 6 are extracted from the extraction port 1, since these are components of the light, at the resonance wavelengths, that propagate into the closed ring with constructive interference.

On the contrary, all of the other non-resonant wavelengths of the input spectrum are transmitted through the transmission port 2 of the BPF resonator filter.

Thus, the two spectra exiting the extraction 1 and transmission 2 ports of the micro-ring resonator filter BPF are complementary to each other, and the resonator rings acts as a bandpass filter for the extraction port 1.

Figure 7:
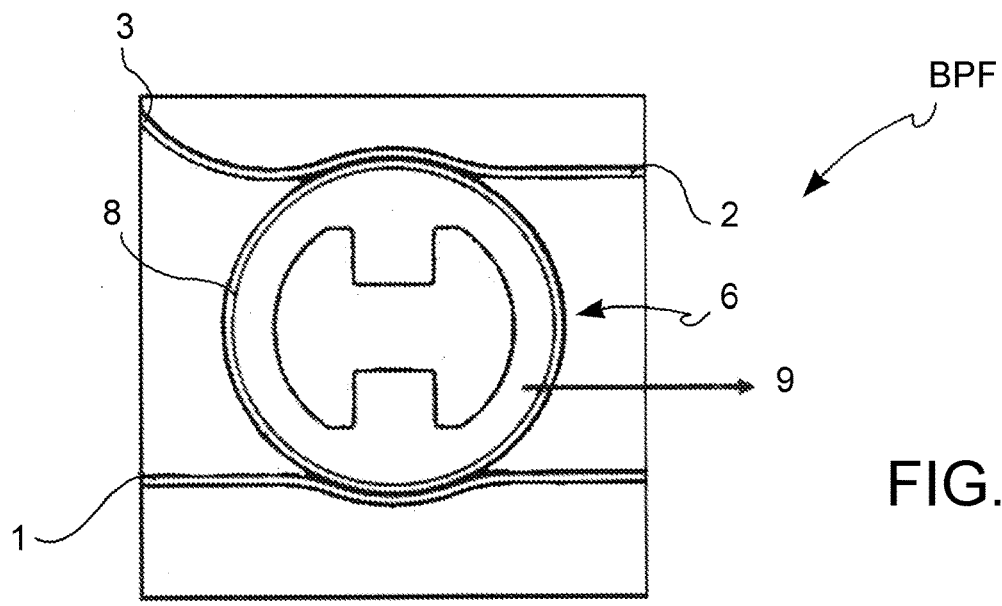
FIG. 7 shows a structural diagram of an optical micro-ring resonator bandpass filter, comprised in one embodiment of the system.

The resonance wavelength of the micro-ring resonator depends on the refractive index of the material and on the geometry of the device (waveguide dimension and ring diameter); the resonant wavelength can be varied, in a controlled manner, i.e., tuned, by means of a small modification of the refractive index of the optical guide, for example, through a thermal tuning based on a local micro-heater 9 (shown, for example, in FIG. 7).

It is worth noting that the extraction port 1 of the optical bandpass filter BPF transforms a shift $\Delta\lambda$ of the operating wavelength of the FBG sensor, due to the variation of the physical parameter to be measured, into a power variation detected by the integrated photo-detector or photodiode (variation of optical power upstream of the photodiode, and corresponding variation of electrical voltage downstream of the photodiode), while the transmission port 2 of the optical bandpass filter BPF provides a retro-reflected signal having a complementary spectrum with respect to the signal exiting the extraction port 1.

Due to the fact that the width of the optical band of the FBG sensor is larger (and, typically, much larger) than the bandwidth of the filter, the power at the output of the transmission port 2 is almost equal to the total power of the spectrum of the FBG sensor (in other words, the portion filtered and extracted at the extraction port 1 is negligible with respect to the total power).

Therefore, a differential detection, which considers the double detection at both ports (extraction and transmission) of the optical bandpass filter, provides a measurement which is immune from spurious fiber losses and power fluctuations of the laser or other optical source.

According to an implementation option (shown, for example, in FIG. 7), the optical micro-ring resonator 6 can be tuned at a wavelength by means of thermo-optical effect in Silicon (in which the micro-ring resonator is integrated). This means that the transfer function of the wavelength filter (i.e., the spectrum of the "drop" port depicted in FIG. 8A) can be moved by applying a command signal in voltage or electric power.

According to some typical implementation examples, the application of a signal in the order of some Volts, with a few dozen mW thermal power dissipated by, on a micro-ring resonator filter having a radius of a dozen μm, can cause a spectrum shift of between 5 and 8 nm.

Figure 8A:
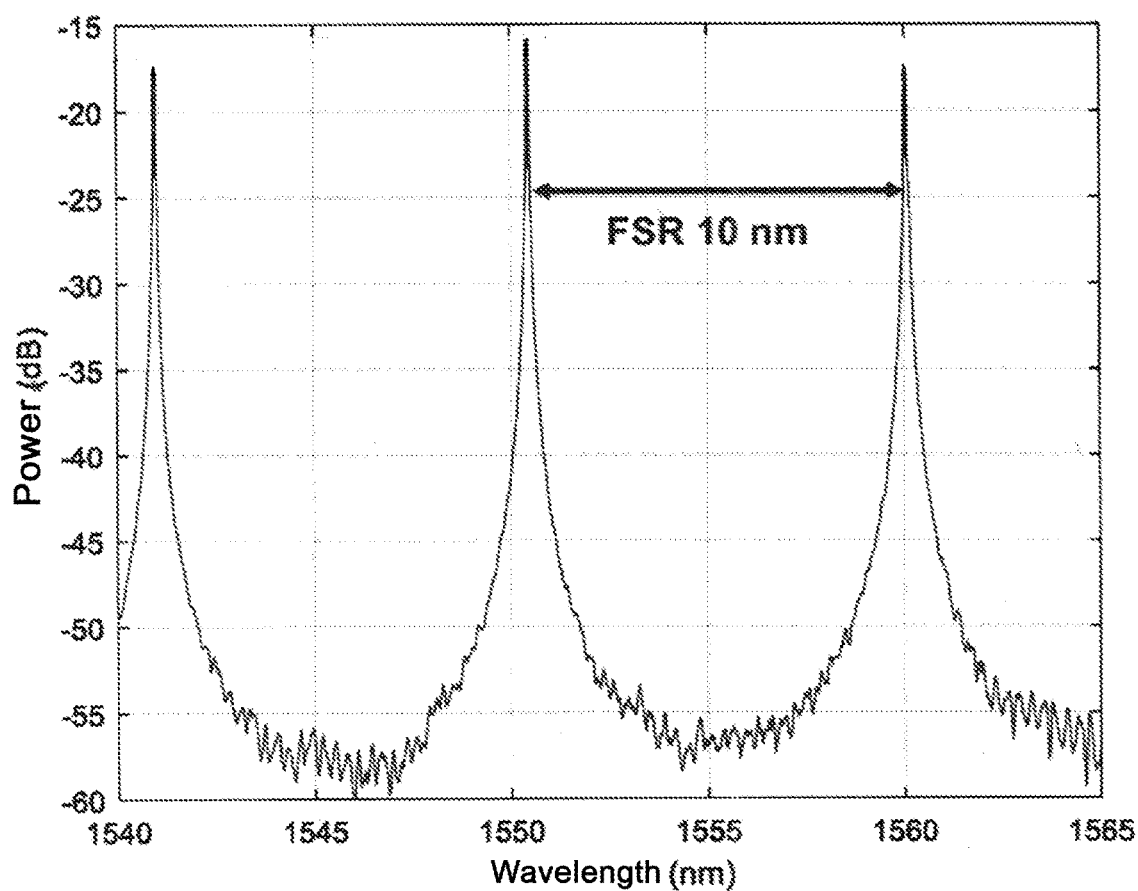
FIGS. 8A and 8B depict the spectra exiting the first extraction port and the second transmission port of the optical filter respectively, when a broadband optical signal is injected at the input.

In the example shown in FIG. 8A, the spectrum of the extraction ports of the micro-ring resonator filter is shown in the range of wavelengths between 1540 nm and 1565 nm. Being a resonance filter, the spectrum is periodic, with a determined Free Spectral Range (FSR), which, in the example in FIG. 8, is equal to 10 nm. The optical micro-ring resonator filter is designed in such a way that the FSR parameter is greater than the maximum shift $\Delta\lambda$ of the operating wavelength of the FBG sensor.

Figure 8B:
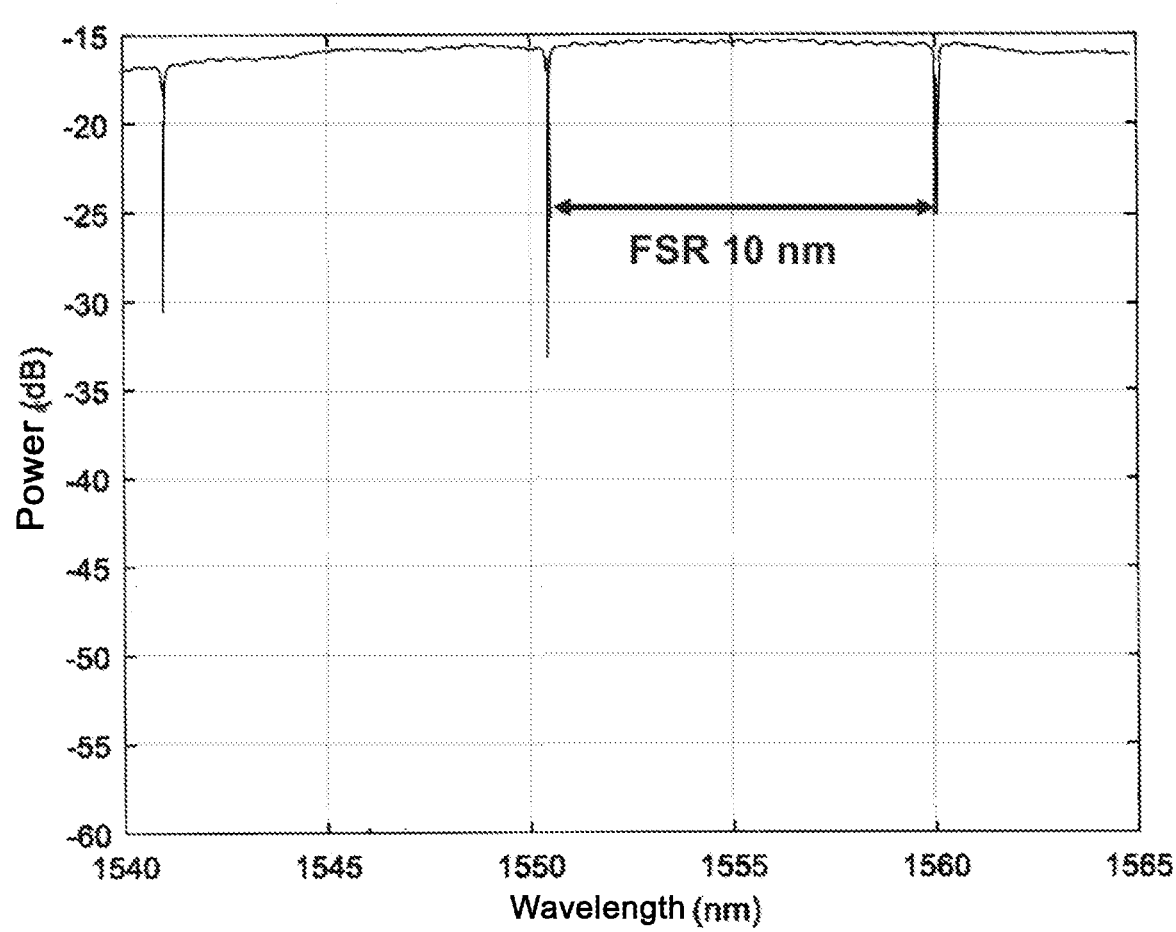

In the example shown in FIG. 8B, the spectrum of the transmission port of the micro-ring resonator filter is shown in the same range of wavelengths between 1540 nm and 1565 nm. In this case, too, being a resonance filter, the spectrum is periodic, with a determined Free Spectral Range (FSR), which, in the example in FIG. 8B, is also equal to 10 nm. As already disclosed above, it is noted that the extraction spectrum (FIG. 8A) and the transmission spectrum (FIG. 8B) are complementary to each other.

Figure 9:
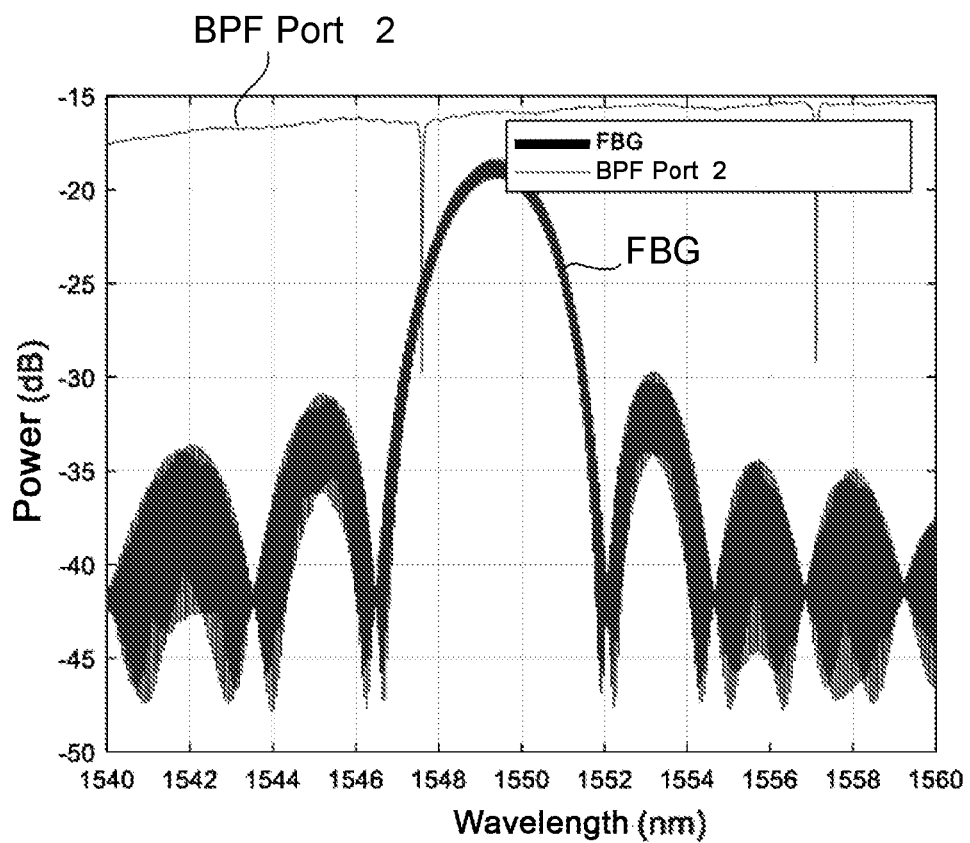
FIG. 9 shows an example of a reflected spectrum of an optical fiber sensor FBG and the narrow-band sampling carried out by the optical bandpass filter in FIGS. 7 and 8.

FIG. 9 shown an example of a reflected spectrum of an optical fiber sensor FBG and the spectrum of the transmission port 2 of the optical bandpass filter BPF.

Figure 10:
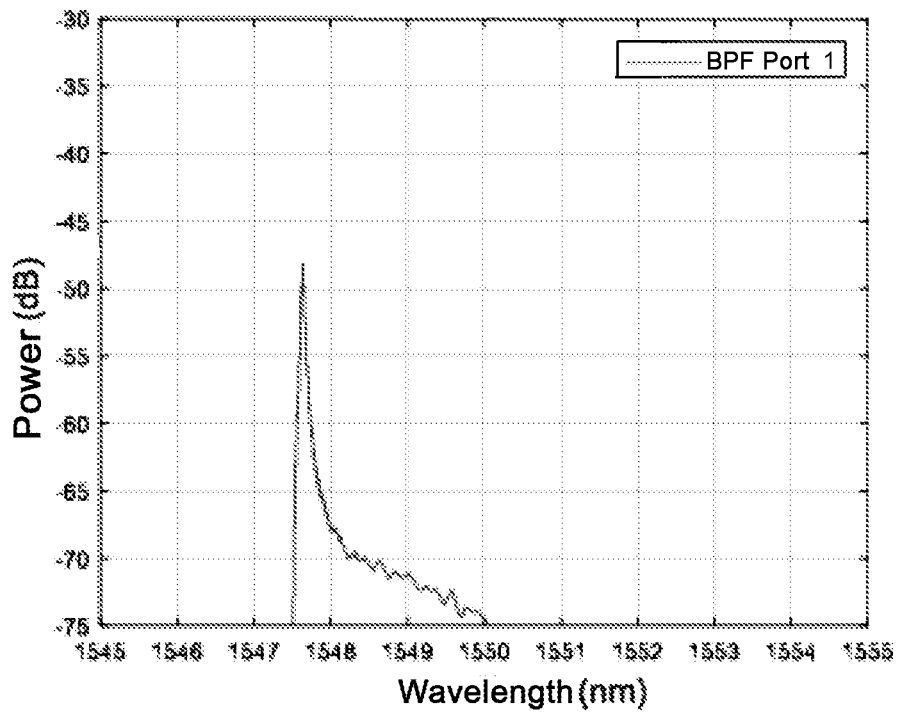
FIGS. 10 and 11 depict the spectra exiting the first extraction port and the second transmission port of the optical filter, respectively, when the optical spectrum reflected by the optical fiber sensor FBG is injected at the input.
Figure 11:
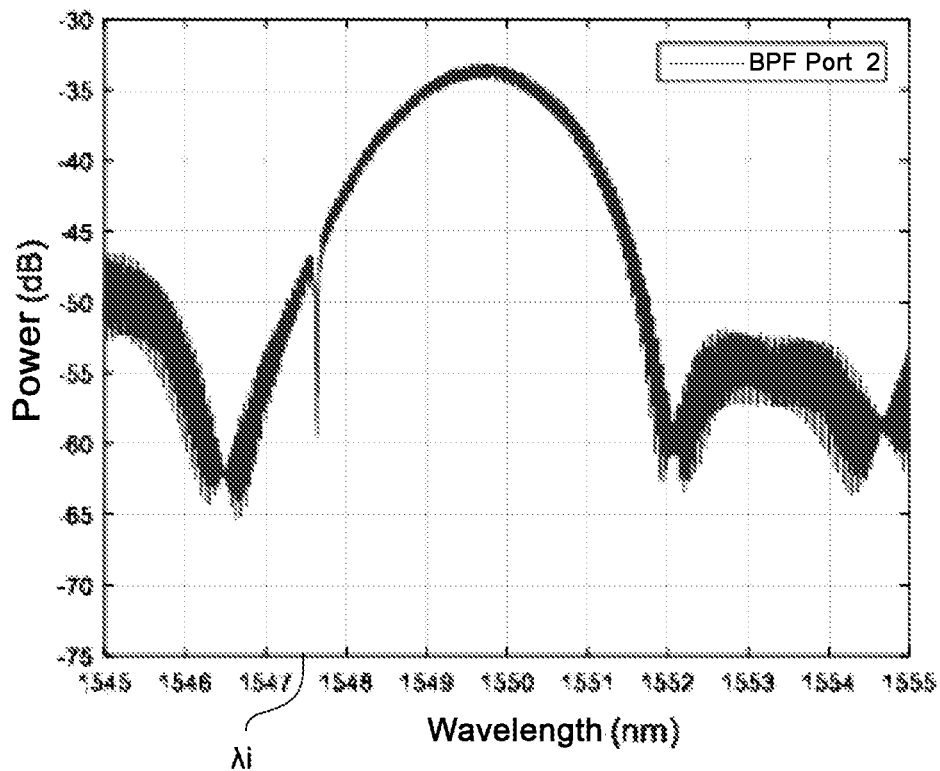

FIGS. 10 and 11 illustrate the spectra exiting the first extraction port 1 and the second transmission port 2 of the optical filter respectively, when, the optical spectrum reflected by the optical fiber sensor FBG is injected at the input.

Figure 12:
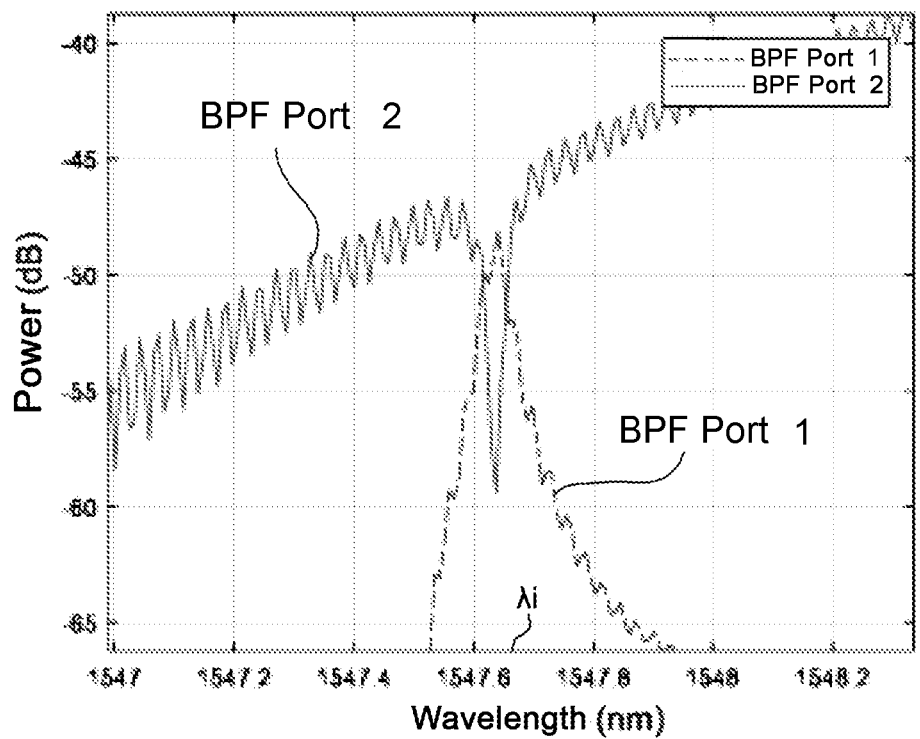
FIG. 12 shows an enlarged detail of the spectra in FIGS. 10 and 11.
Figure 13:
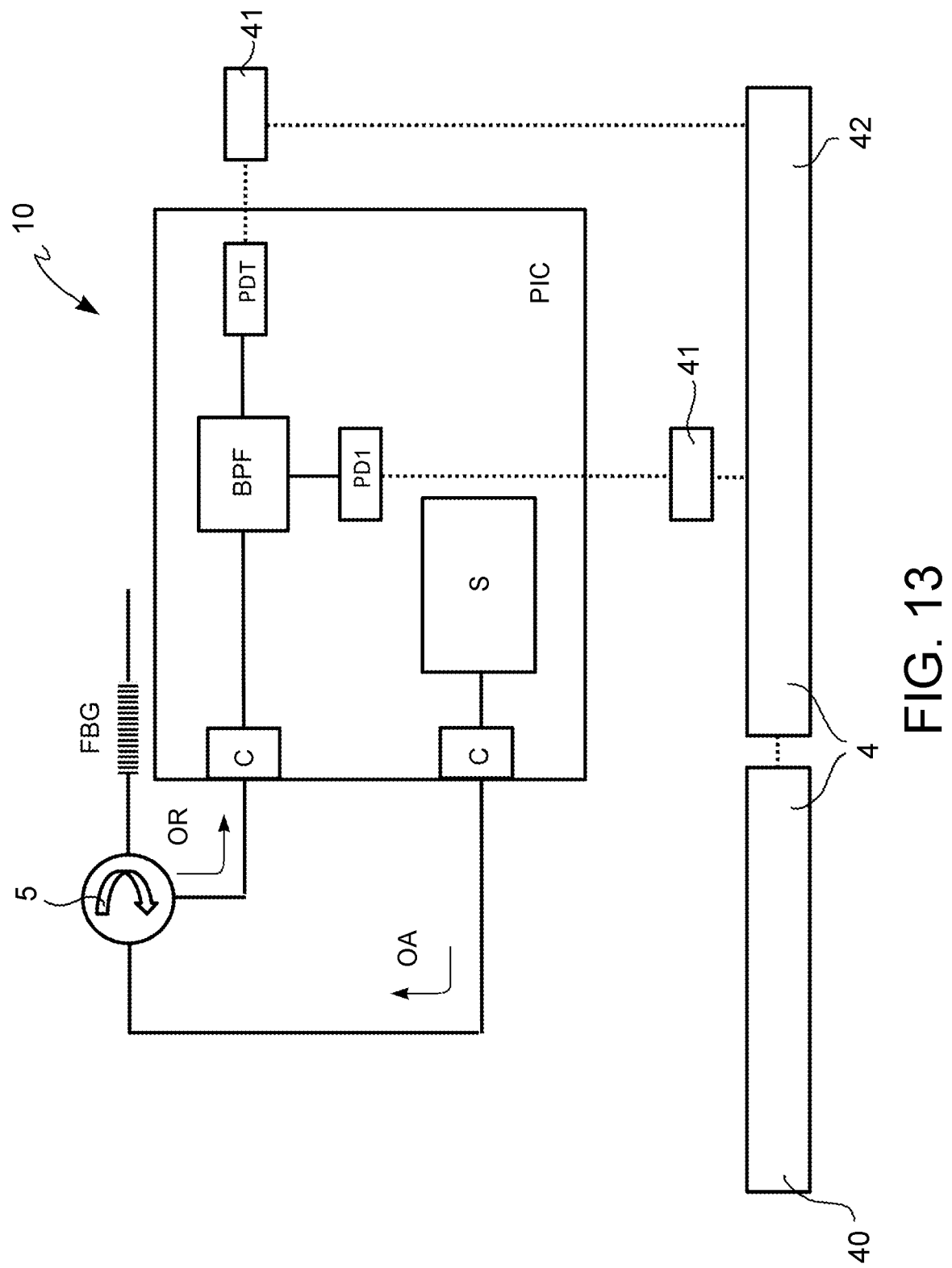
FIGS. 13 and 14 show two further respective embodiments of a system for interrogating an optical fiber sensor of the Fiber Bragg Grating type according to the present invention by means of functional block diagrams.
Figure 14:
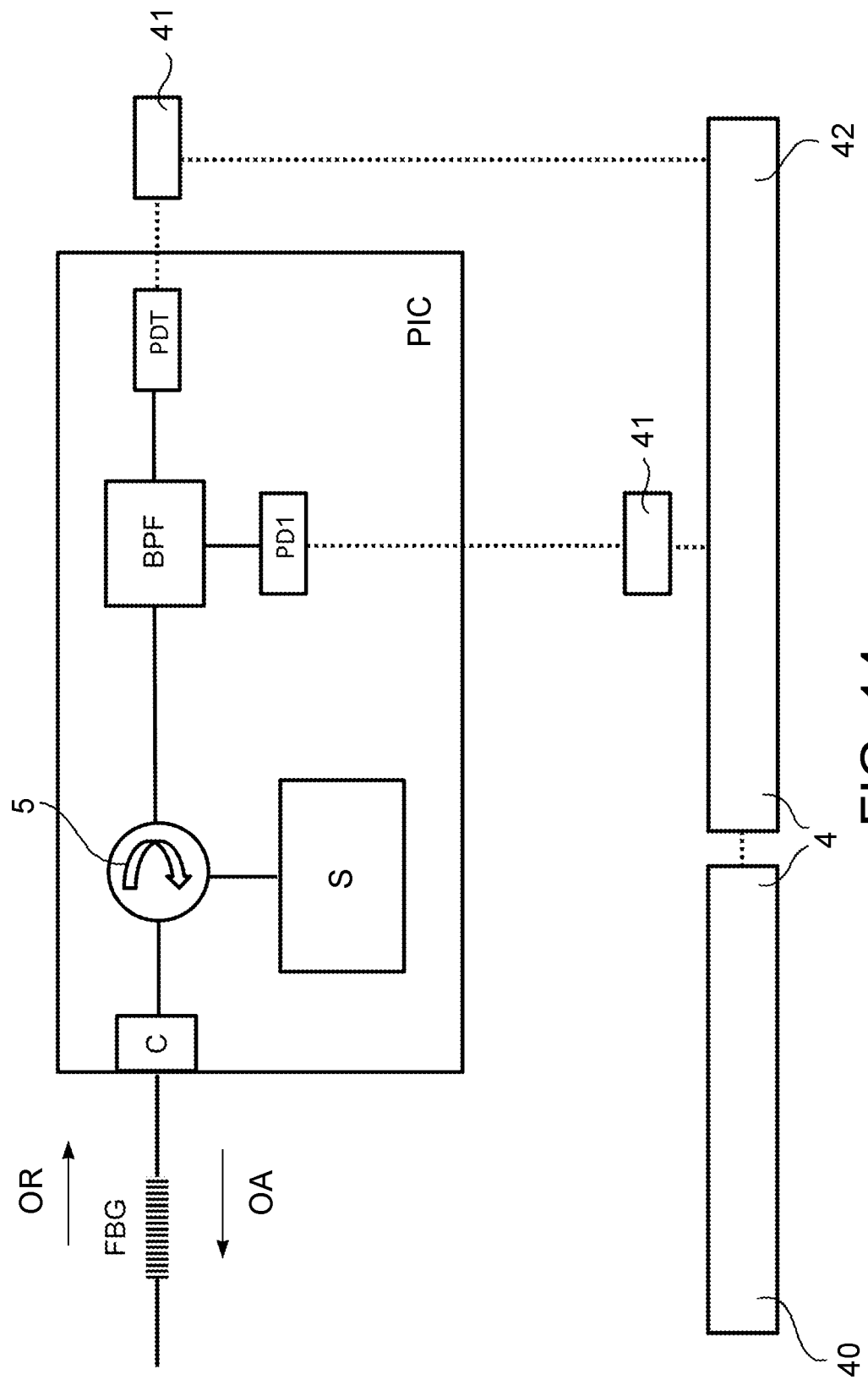

FIG. 12 shows an enlarged detail of the spectra in FIGS. 10 and 11, around the wavelength λi.

From a structural point of view, the micro-ring resonator is a compact and flexible device, and it can be integrated in a photonic integrated circuit PIC on different technological platforms, such as photonics on silicon (Si) or InP; furthermore, integrated photo-detectors, capable of providing quick broadband responses, can be obtained on the same platform.

As already previously described, in some implementation options, the optical circulator 5 and/or the broadband optical radiation source S can also be integrated on the same platform.

With reference to the aforesaid one or more optical fiber sensors in Fiber-Bragg Grating technology (also defined herein below as "FBG" sensors) it is possible to note that an FBG sensor is a highly sensitive and versatile optical device for measuring various physical parameters, including, for example, strain and temperature. In the simplest form thereof, an FBG sensor is obtained by means of a spatially periodic modulation of the refractive index inscribed in the "core" of the optical fiber.

FBG sensors exploit the presence of a resonant condition, which reflects the light incident at the so-called "Bragg wavelength" $\lambda_B$, defined as $\lambda_B=2n_{eff}\Lambda$, where $n_{eff}$ is the effective refractive index of the fundamental mode of the optical fiber and $\Lambda$ is the spatial pitch (periodicity) of the grating.

The operating principle of FBG sensors is based on the property that any change in the effective refractive index or grating pitch, caused by external effects, such as strain or temperature, results in a respective shift $\Delta\lambda_B$ of the operating wavelength (Bragg wavelength), which can be derived from formula [1]:

$$\frac{\Delta\lambda_B}{\lambda_B} = k\varepsilon + \alpha_T \Delta T$$

where $\Delta\lambda_B=\lambda-\lambda_B$ is the Bragg wavelength variation with respect to the reference Bragg wavelength $\lambda_B$, k is a scale factor and $\alpha_T$ is the thermo-optical coefficient; the Bragg wavelength shift is linearly dependent on the longitudinal strain E with a sensitivity value equal to about 1.2 pm/με and the temperature change with a sensitivity value equal to about 11 pm/° C. for silicon fibers in the range of 1550 nm. Such dependences can have non-linear features in strain and temperature variations ranges which are particularly large and dependent on the particular type of FBG sensor considered.

FBG sensors are "passive" sensors, meaning that they do not need to be powered, but they are activated by lighting, i.e., by sending an optical activation radiation, at an appropriate wavelength (e.g., the Bragg wavelength), in the optical fiber section, in which the grating in the sensor is obtained. In response to this, the FBG sensor either reflects or transmits an optical (i.e., photonic) signal which depends not only on the incident radiation, but also on the strain and temperature conditions to which the grating itself is subjected. In various implementation options of the method, illustrated herein below, such a photonic signal can be an optical signal (or optical spectrum) which is transmitted or an optical signal (or optical spectrum) which is reflected.

According to a particular implementation option of the system 10, the at least one optical fiber sensor of the Fiber Bragg Grating type FBG is an optical fiber sensor of the Fiber Bragg Grating type having a reflection spectrum with a linear shape.

This embodiment exploits the highly linear shape of the response of the FBG sensor as a linear reflective filter, to guarantee elevated dynamic interrogation performance and a wide dynamic range for strain or temperature measurements. The use of the FBG sensor with a linear response also simplifies the calibration of the interrogator.

According to an embodiment of the system 10, the aforesaid first opto-electronic receiver PD1 comprises (or consists of) a first photodiode, and the aforesaid second opto-electronic receiver PDT comprises (or consists of) a second photodiode.

The aforesaid first and second photodiode are, for example, semi-conductor photodiodes, of the type known per se, designed to detect and convert optical signals, at the wavelengths considered, into electrical signals.

According to an embodiment, shown in FIG. 1, the system 10 is configured to interrogate only one optical fiber sensor of the Fiber Bragg Grating type FBG, acting on the reflected spectrum OR of the FBG sensor.

According to another embodiment, shown in FIG. 2, the system 10 is configured to interrogate only one optical fiber sensor of the Fiber Bragg Grating type FBG, acting on the transmitted spectrum OT of the FBG sensor.

Figure 3:
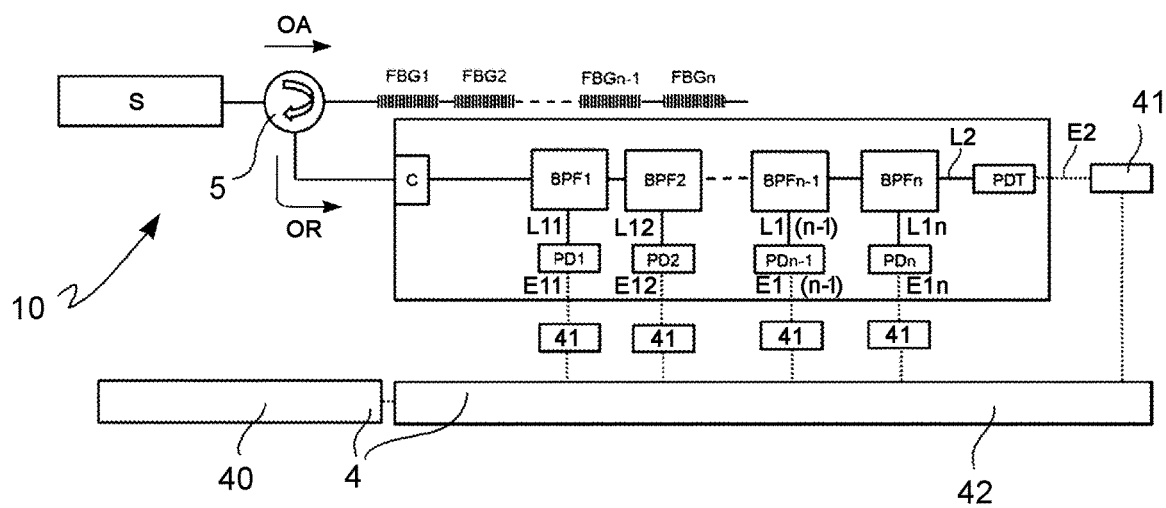
Figure 4:
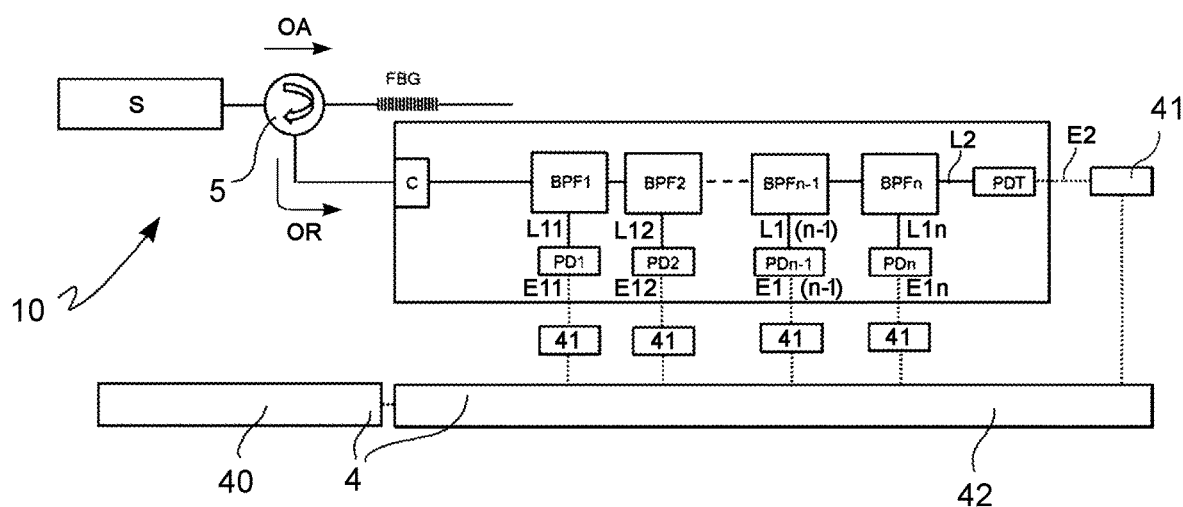
Figure 5:
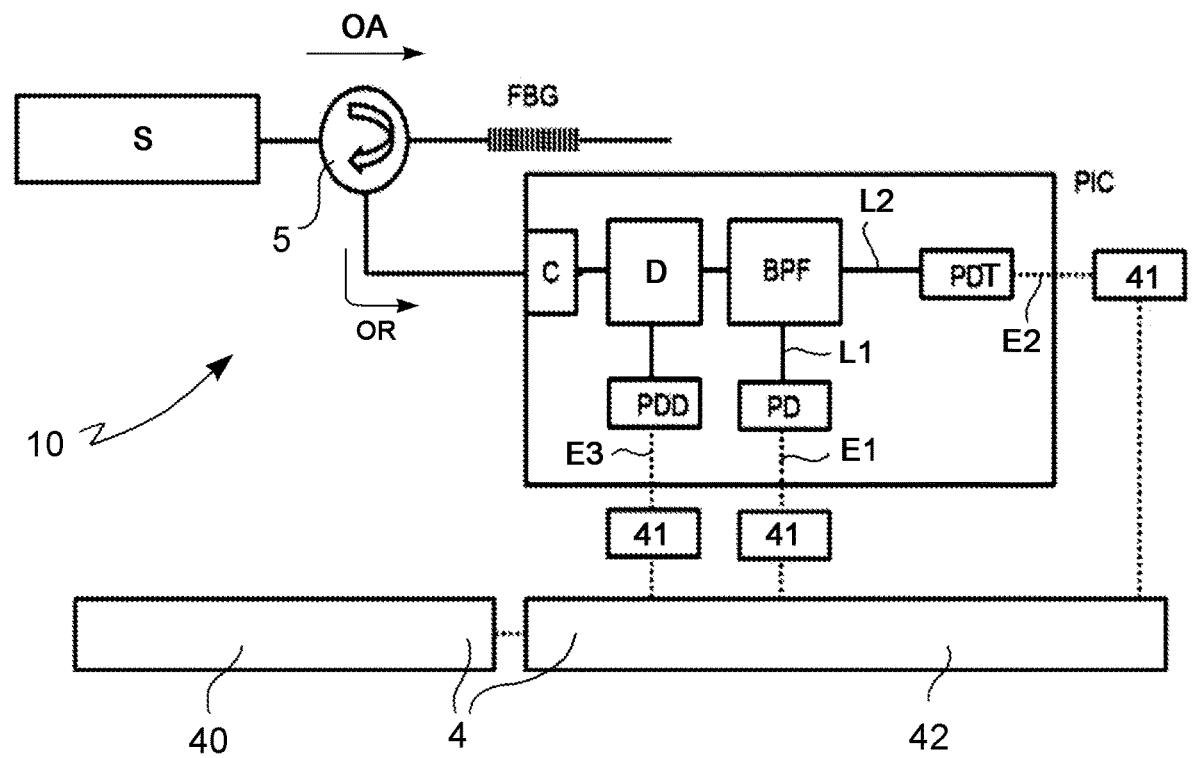

According to another embodiment shown in FIG. 3, the system comprises a plurality of optical fiber sensors of the Fiber Bragg Grating FBG1-FBGn type, in cascade, each characterized by a respective nominal operating wavelength $\lambda 1$-$\lambda n$, and a respective plurality of tunable optical bandpass filters BPF1-BPFn in cascade (i.e., in a configuration, in which the transmission port of a filter is connected to the input port of the filter placed just afterwards in the cascade), each tunable around a respective wavelength corresponding to a respective one of the nominal operating wavelengths $\lambda 1$-$\lambda n$ of the optical fiber sensors of the Fiber Bragg Grating FBG1-FBGn type.

The system 10 further comprises a plurality of opto-electronic receivers (PD1-PDn), configured to receive a plurality of first optical signals L11-L1n and convert such a plurality of first optical signals L11-L1n into a respective plurality of first electrical signals E11-E1n; and a second opto-electronic receiver PDT, operatively connected to the second transmission port 2 of the last optical bandpass filter BPF of the cascade of optical bandpass filters to receive the second optical signal L2 and convert it into a respective second electrical signal E2.

In this case, the electronic processing means 4 are configured to determine the wavelength shift $\Delta\lambda$, with respect to the nominal operating wavelength, of each of the spectra reflected or transmitted by each of the optical fiber sensors of the Fiber Bragg Grating type FBG1-FBGn, based on the plurality of first electrical signals detected E11-E1n, and the second electrical signal E2.

In such an embodiment, the i-th BPF ring resonator filter is tuned at a certain wavelength $\lambda i$ for interrogating the i-th FBGi sensor; each single BPFi bandpass filter is tuned at a different wavelength $\lambda i$ and the combined acquisition of the signals by the N photo-detectors provides the measurement of the wavelength peaks of each of the different N FBG sensors.

According to another embodiment (shown in FIG. 4), the system 10 comprises at least one optical fiber sensor of the Fiber Bragg Grating FBG type, operating and suitable to be interrogated along a wide range of wavelengths.

In this case, the system 10 further comprises a plurality of tunable optical bandpass filters BPF1-BPFn in cascade, each being tunable at a respective operating wavelength $\lambda 1$-$\lambda n$, which is kept constant, belonging to the wide range of wavelengths of the aforesaid optical spectrum transmitted or reflected by the sensor.

The system further comprises a plurality of first opto-electronic receivers PD1-PDn, configured to receive the plurality of first optical signals L11-L1n into a respective plurality of first electrical signals E11-E1n; and a second opto-electronic receiver PDT, operatively connected to the second transmission port 2 of the last optical bandpass filter BPF of the cascade of optical bandpass filters, to receive the second optical signal L2 and convert it into a respective second electrical signal E2.

In this case, the electronic processing means 4 are configured to determine the peak of the reflection or transmission wavelength of the FBG sensor, in the aforesaid wide range of wavelengths, based on the plurality of first electrical signals detected E11-E1n, and on the second electrical signal detected E2.

In such an embodiment, a single FBG sensor can be queried in the case where it is experiencing a great variation in the wavelength peak, due to extreme environmental conditions (e.g., thermal excursions). The combined acquisition by the N photo-detectors at the N extraction ports of the ring resonators provides the measurement of the peak wavelengths along a wide range of wavelength variations due, for example, to great changes in temperature or strain.

According to an implementation option, referring to the case where there is a plurality of optical filters, a CWDM (Coarse WDM) de-multiplexer is used to feed the different optical filters (instead of arranging them in cascade), to reduce losses on the optical path, advantageously. Usefully, the i-th channel of the CWDM de-multiplexer can be used to interrogate the i-th optical fiber sensor FBGi, the Bragg wavelength $\lambda i$ of which is variable within the optical band of the corresponding i-th channel.

According to a preferred implementation option, each of the first electrical signals E1i (belonging to the group E11-E1n) is representative of an electrical voltage, proportional to the optical power incident on a respective opto-electronic receiver Pdi (belonging to the group of opto-electronic receivers PD1-PDn), and therefore, it is correlated (for example, proportional) to the respective wavelength shift Δλi of the spectrum reflected or transmitted by the respective optical fiber sensor FBGi (belonging to the group of sensors FBG1-FBGn).

Note that, in the embodiments including a plurality of optical bandpass filters, each of such optical bandpass filters is used as a fixed filter, and not as a tunable filter (a tuning is carried out only during the initial setting, but not during the operation).

Furthermore, in such embodiments, the Free Spectral Range must be greater than the sum of the tuning excursions allowed for each of the optical bandpass filters. To this end, the radius R of the rings can be defined during the designing, taking into account the following relationship, which binds such radius R to the Free Spectral Range FSR:

$$FSR = \frac{\lambda_{res}^2}{n_g R}$$

where $\lambda_{res}$ is the Bragg wavelength of the FBG sensor and $n_g$ is the group index of the propagation wave guide.

According to a further embodiment (shown in FIG. 5) the system 10 further comprises an optical band splitter D, arranged upstream of the tunable optical filter BPF, and a third opto-electronic receiver PDD, where the optical band splitter D is configured to split the total optical power and send a part thereof to the third opto-electronic receiver PDD, and where the third opto-electronic receiver PDD is configured to obtain a third electrical signal E3, adapted to support a further compensation.

According to an implementation option, shown in FIGS. 1-5, the system 10 further comprises an optical circulator 5 having a first port connected to the broadband optical radiation source S, a second port connected to an optical fiber F containing the optical fiber sensor of the Fiber Bragg Grating type FBG, and a third port connected to the at least one optical bandpass filter BPF.

The optical circulator 5 is configured to transmit the broadband optical radiation S, received by the first port, to the optical fiber F containing the optical fiber sensor FBG, through the second port, and it is further configured to transmit the spectrum reflected OR by the optical fiber sensor of the Fiber Bragg Grating type FBG, received by the second port, to the at least one optical bandpass filter BPF, through the third port.

According to one implementation option, the optical circulator 5 is a component external to the photonic integrated circuit PIC, in which the optical bandpass filter BPF and the first PD1 and the second opto-electronic receiver PDT are integrated.

According to another implementation option, the optical circulator 5 is integrated in the photonic integrated circuit PIC, in which the optical bandpass filter BPF, the first PD1 and the second opto-electronic receiver PDT are integrated. To this end, appropriate integration technologies, known per se, can be used, for example, based on magneto-optical materials and bonding techniques on Silicon-On-Insulator SOI technological platform (as shown, for example, in the scientific article *"Broadband TE Optical Isolators and Circulators in Silicon Photonics through CE: YIG Bonding"*— P. Pintus et al., Journal of Lightwave Technology, Vol. 37, No. 5, Mar. 1, 2019).

According to an implementation option of the system 10, each sensor of the at least one optical fiber sensor of the Fiber Bragg Grating type FBG is configured to detect a strain acting in the position where the sensor is.

According to some significant examples of use of the system, the optical fiber sensor of the Fiber Bragg Grating FBG type is configured to act within a brake pad or be incorporated or coupled to a brake caliper, or incorporated in a washer device, adapted to be arranged between a brake caliper support and a brake caliper. In this case, the at least one strain detected by the at least one optical fiber sensor of the Fiber Bragg Grating FBG type is representative of a tightening force and/or braking torque acting on the brake caliper.

According to an implementation option, the electronic processing means 4 comprise at least one electronic processor or micro-processor 40, of the type known per se, adapted to store and run software programs.

According to different implementation options (as shown in FIGS. 1-5) the system 10 can comprise further electronic systems, which are known per se, such as, for example, ADC analog-digital converters, trans-impedance amplifiers 41, ASIC 42 devices for conditioning the electrical signals, and appropriate optical connections (indicated with a continuous line in FIGS. 1-5) and electrical connections (indicated with a dotted line in FIGS. 1-5).

According to other possible implementation options, the functional block 42 is intended as a block for conditioning the analog signals (i.e., adaptation of the converted and amplified signals), and the functional block 40 is a digital signal conversion and processing block 40, which provides the processed data on an appropriate interface/bus at the output.

According to an implementation option, the functional block 40 and, at least partially, the functional block 42 can be obtained by means of a single integrated circuit, for example, of the ASIC or FPGA type.

With reference to the relationship between the power detected at the extraction port 1 of the optical bandpass filter and the wavelength shift Δλ of the FBG sensor, different experimental or analytical approaches can be used.

For example, tables (e.g., look-up tables) can be stored in the electronic processing means (for example, in the conversion and processing block 40), based on measurements carried out during the characterization, which establish the relationship between a measured voltage value and a shift value of the peak wavelength of the FBG sensor.

According to another example, the following simplified analytical relationships may be considered.

The optical spectrum seen by the photo-detector $S_{OPT}(\lambda)$ is proportional, through a constant C, to the products of the spectra of the FBG sensor and the micro-ring resonator MRR (at the extraction port):

$$S_{OPT}(\lambda) = C H_{FBG} H_{MRR}$$

and the optical power measured is an integral on the wavelength, which depends on $\lambda_{FBG}$:

$$P_{OPT} = \int S_{OPT}(\lambda) d\lambda$$

As regards the power compensation, made possible by the detection of the optical signal on the transmission port of the optical bandpass filter, it can be carried out, for example, by means of normalization of the power detected at the extraction port with respect to the power detected at the transmission port.

According to another implementation option, it is possible to normalize the difference between the power detected at the extraction port and the power detected at the transmission port with respect to the sum between the power detected at the extraction port and the power detected at the transmission port.

According to an implementation option, the method and the system according to the invention comprise an active control of the temperature of the chip and relative electronic compensations, so as to allow the operation thereof on a wide temperature range, for example, in environments with elevated thermal excursion.

As can be noted, the object of the present invention is fully achieved by the method and system disclosed above, by virtue of the functional and structural features thereof.

In fact, with reference to the technical problems mentioned in the part describing the prior art, the system according to the invention is a simple and compact system, in which the essential components are integrated (for example, in photonic integrated circuits in PIC technology).

The integration can be carried out by means of silicon technology; in particular, the system according to the invention lends itself to an integration of both photonic circuits and electronic circuits in hybrid chips produced using the same process.

Furthermore, if desired, the technical solution described above also allows the broadband source and/or the optical circulator to be integrated in the same integrated circuit, in which the optical filter and the photo-detectors are integrated, providing a remarkable design flexibility.

Furthermore, the system and method of the present invention work by keeping the wavelength of the optical bandpass filters constant (which are only tuned in an initial setting step), which take a portion of the spectra transmitted or reflected by the FBG sensor. Since such spectra move due to effects related to the variable to be measured, the constant wavelength sampling by the micro-ring optical filter records such variations in the form of variations in detected power.

Due to this, the dynamic performance doesn't depend on the tuning times of the optical bandpass filter, but only on the speed of the photo-detection block, therefore providing a much quicker dynamic response with respect to the previously stated known solutions.

Additionally, the system and method according to the invention, exploiting the simultaneous detection of the optical power both on the extraction port and on the transmission port, have improved immunity with respect to spurious losses and/or fluctuations in the optical lighting power.

It is also noted that the claimed solution includes a narrow-band optical filtering of the transmission or reflection spectrum of the FBG optical fiber sensor around the operating wavelength (unlike what would be obtained by using, for example, solutions based on Fabry-Perot filters, the bandwidth of which can be compared to that of the optical signal of the FBG sensor to be queried). The fact that the bandwidth of the spectrum reflected by the interrogated FBG sensor is greater than the line width of the resonance spectrum of the optical filter used in the present solution (and, in particular, much greater in the implementation option which includes using micro-ring optical resonator filters), offers various advantages, including: the possibility of disturbing the spectrum exiting the transmission port of the filter as little as possible; the possibility of selecting the "finesse" of the resonance spectrum of the optical filter as an important design parameter to improve the performance of the interrogator in terms of spectral dynamic resolution.

The method and system described above further allow to obtain responses on a broad receiving band. In fact, the band depends on the reception band of the photodiodes used, i.e., on components capable of acting on a very wide band (for example, integrated photodiodes of the PIN type are known, which use, as absorption material, Germanium with bands ranging from MHz even up to 40 GHz. For the applications considered herein, it is necessary to observe phenomena with bands no larger than hundreds of KHz, which are easily guaranteed by the system according to the invention).

Other advantages of the method and system according to the invention comprise low power consumption of the integrated devices on PIC; compatibility with CMOS manufacturing processes, for manufacturing PIC optical chips and EIC electronic chips; the capability to operate along wide temperature ranges, which can be obtained by means of an active control of the temperature of the chip and electronic compensations for operation in environments with elevated thermal excursion.

In order to meet contingent and specific needs, those skilled in the art can make several changes and adaptations to the embodiments described above and replace elements with others which are functionally equivalent, without departing from the scope of the following claims. Each of the features described as belonging to a possible embodiment can be obtained irrespective of the other embodiments described.

The invention claimed is:

1. A method for interrogating at least one optical fiber sensor of Fiber Bragg Grating (FBG) type, said method comprising:
    lighting said at least one FBG sensor with a broadband excitation optical radiation;
    conveying an optical spectrum transmitted or reflected by the at least one FBG sensor into at least one tunable optical bandpass filter (BPF) comprising a first extraction port and a second transmission port which are complementary to each other;
    tuning the at least one tunable optical bandpass filter BPF at a constant operating wavelength, depending on a nominal operating wavelength of the fiber Bragg grating of the at least one FBG sensor;
    detecting a first optical signal exiting the first extraction port of the at least one tunable optical BPF, said first optical signal being a narrow-band optical filtering of the transmission or reflection spectrum of the fiber Bragg grating of the at least one FBG sensor around the constant operating wavelength of the at least one tunable optical BPF;
    converting, by a first opto-electronic receiver, said first optical signal into a respective first electrical signal, representative of a wavelength shift, with respect to the nominal operating wavelength, of the optical spectrum transmitted or reflected by the fiber Bragg grating of the at least one FBG sensor;
    detecting a second optical signal, exiting the second transmission port of the at least one tunable optical bandpass filter BPF, which is spectrally complementary to the first optical signal;
    converting said second optical signal, by a second opto-electronic receiver, into a respective second electrical signal, representative of a reference optical power which is substantially independent of a filtering wavelength, and having a dependence on power of the broadband excitation optical radiation, and on losses of the overall optical path, equal to the dependence undergone by the first optical signal; and
    determining the wavelength shift, with respect to the nominal operating wavelength, of the optical spectrum transmitted or reflected by the fiber Bragg grating of the at least one FBG sensor, based on the first electrical signal detected, deriving from the first optical signal exiting the first extraction port of the at least one tunable optical BPF, and based on the second electrical signal, representative of the reference optical power detected, deriving from the second optical signal exiting the second transmission port of the at least one tunable optical bandpass filter BPF, so that detection of the first electrical signal is compensated for with respect to variations in power of broadband excitation optical radiation and to variations of optical path loss, wherein said determined wavelength shift of the optical spectrum transmitted or reflected by the fiber Bragg grating is representative of physical magnitude measured by the at least one FBG sensor; and wherein said at least one tunable optical BPF, said first opto-electronic receiver and said second opto-electronic receiver are integrated in a photonic integrated circuit (PIC).

2. The method of claim 1, wherein the at least one tunable optical bandpass filter BPF comprises a third input port, different from said first extraction port and said second transmission port, and wherein the conveying step comprises conveying the optical spectrum transmitted or reflected by the at least one FBG sensor to said third input port of the at least one tunable optical bandpass filter BPF.

3. The method of claim 1, wherein said at least one tunable optical bandpass filter BPF is an optical micro-ring resonator filter.

4. The method of claim 1, wherein said tuning step comprises tuning the at least one tunable optical bandpass filter BPF at a constant operating wavelength positioned on a linear or almost linear zone of the nominal transmission or reflection spectrum of the fiber Bragg grating of the at least one FBG sensor, so that the wavelength shift or variation of the transmission or reflection spectrum of said FBG sensor corresponds to a linear or almost linear variation of the power or intensity of said first optical signal.

5. The method of claim 1, configured to interrogate a plurality of FBG sensors in cascade, each FBG sensor having a respective nominal operating wavelength, wherein
the conveying step comprises conveying the entire transmitted or reflected optical spectrum from the cascade of FBG sensors into a cascade of tunable optical bandpass filter BPFs;
the tuning step comprises tuning each tunable optical bandpass filter BPF around a respective operating wavelength corresponding to a respective one of the nominal operating wavelengths of the FBG sensors;
the step of detecting a first optical signal comprises detecting a plurality of first optical signals exiting the first extraction port of each of the tunable optical bandpass filters BPFs, each at the respective operating wavelength, which is kept constant;
the converting step comprises converting the plurality of first optical signals into a respective plurality of first electrical signals, by a plurality of first photodiodes;
the step of detecting a second optical signal comprises detecting an optical signal exiting the second transmission port of the last tunable optical bandpass filter BPF of the cascade of tunable optical BPFs, and converting said second optical signal into a respective second electrical signal, by said second opto-electronic receiver; and
the determining step comprises determining the wavelength shift, with respect to the nominal operating wavelength, of each spectrum transmitted or reflected by each FBG sensor, based on the plurality of first electrical signals detected, and on the second electrical signal detected.

6. The method of claim 1, configured to interrogate only one FBG sensor on a wide range of wavelengths, wherein
the conveying step comprises conveying the optical spectrum transmitted or reflected by the FBG sensor in a cascade of tunable optical BPFs;
the tuning step comprises tuning each tunable optical bandpass filter BPF at a respective operating wavelength, which is kept constant, belonging to the wide range of wavelengths of said optical spectrum transmitted or reflected by the FBG sensor;
the step of detecting a first optical signal comprises detecting a plurality of first optical signals exiting the first extraction port of each of the tunable optical bandpass filter BPFs;
the step of converting the first optical signal comprises converting the plurality of first optical signals into a respective plurality of first electrical signals, by a plurality of first photodiodes;
the step of detecting a second optical signal comprises detecting an optical signal exiting the second transmission port of a last tunable optical bandpass filter BPF of the cascade of tunable optical bandpass filters BPFs;
the step of converting the second optical signal comprises converting said second optical signal into a respective second electrical signal, by a second opto-electronic receiver; and
the determining step comprises determining a peak of transmission or reflection wavelength of the FBG sensor, within said wide range of wavelengths, based on the plurality of first electrical signals detected, and on the second electrical signal detected.

7. The method of claim 1, further comprising, before the conveying step, a step of splitting the total optical power, by an optical splitter, and sending a part thereof to a third opto-electronic receiver to obtain a third electrical signal adapted to support a further compensation.

8. A system for interrogating at least one optical fiber sensor of fiber Bragg grating (FBG) type, comprising:
at least one FBG sensor;
a broadband optical radiation source, configured to light the at least one FBG sensor with a broadband excitation optical radiation;
at least one tunable optical bandpass filter (BPF) comprising a first extraction port and a second transmission port, which are complementary to each other, and further comprising an input port, different from said first extraction port and second transmission port, operatively connected to said at least one FBG sensor to receive an optical spectrum transmitted or reflected by said FBG sensor,
wherein the tunable optical bandpass filter BPF is tunable, in a range of wavelengths, at a constant operating wavelength, depending on a nominal operating wavelength of the fiber Bragg grating of the FBG sensor;
a first opto-electronic receiver, operatively connected to said first extraction port of the tunable optical bandpass filter BPF to receive a respective first optical signal and configured to convert said first optical signal into a respective first electrical signal, wherein said first optical signal is a narrow-band optical filtering of the transmission or reflection spectrum of the fiber Bragg grating of FBG sensor at the constant operating wavelength of the tunable optical bandpass filter BPF;

a second opto-electronic receiver, operatively connected to said second transmission port of the tunable optical bandpass filter BPF to receive a second optical signal, and configured to convert said second optical signal into a respective second electrical signal, to obtain a reference electric power value, which is substantially independent of the filtering wavelength, and having a dependence on power of the broadband excitation optical radiation, and on losses of the overall optical path, equal to the dependence undergone by the first optical signal; and electronic processing means, operatively connected to said first opto-electronic receiver and said second opto-electronic receiver, configured to determine a wavelength shift, with respect to the nominal operating wavelength, of the spectrum transmitted or reflected by the fiber Bragg grating of the FBG sensor, based on the first electrical signal detected, deriving from the first optical signal, and based on the second electrical signal, representative of a reference optical power detected, deriving from the second optical signal, so that detection of the first electrical signal is compensated for with respect to variations of broadband excitation optical radiation power and to variations of optical path loss, wherein said wavelength shift of the spectrum transmitted or reflected by the determined fiber Bragg grating is representative of physical magnitude measured by the FBG sensor; and wherein said tunable optical bandpass filter BPF, said first opto-electronic receiver and said second opto-electronic receiver are integrated in a photonic integrated circuit (PIC).

9. The system of claim 8, wherein said tunable optical bandpass filter BPF is an optical micro-ring resonator filter.

10. The system of claim 9, wherein said optical micro-ring resonator filter is of single-ring type, comprising one optical ring.

11. The system of claim 9, wherein said optical micro-ring resonator filter is of double-ring type, comprising two optical rings.

12. The system of claim 8, wherein the broadband optical radiation source is integrated in said PIC.

13. The system of claim 8, wherein the at least one FBG sensor is an FBG sensor having a reflection spectrum with a linear shape.

14. The system of claim 8, comprising:
a plurality of FBG sensors in cascade, each FBG sensor having a respective nominal operating wavelength;
a respective plurality of tunable optical bandpass filters BPFs in cascade, each being tunable around a respective operating wavelength corresponding to a respective one of the nominal operating wavelengths of the FBG sensors;
a plurality of first opto-electronic receivers, configured to receive a plurality of first optical signals and convert said plurality of first optical signals into a respective plurality of first electrical signals;
a second opto-electronic receiver, operatively connected to the second transmission port of a last tunable optical bandpass filter BPF of the cascade of tunable optical bandpass filters BPFs to receive the second optical signal and convert said second optical signal into a respective second electrical signal;
wherein the electronic processing means are configured to determine the wavelength shift, with respect to the nominal operating wavelength, of each spectrum transmitted or reflected by each FBG sensor, based on the plurality of first electrical signals detected, and on the second electrical signal.

15. The system of claim 12, comprising:
at least one FBG sensor operating and capable of being interrogated on a wide range of wavelengths;
a plurality of tunable optical bandpass filters BPFs in cascade, each being tunable at a respective operating wavelength, which is kept constant, belonging to the wide range of wavelengths of the optical spectrum transmitted or reflected by the at least one FBG sensor;
a plurality of first opto-electronic receivers, configured to convert the plurality of first optical signals into a respective plurality of first electrical signals; and
a second opto-electronic receiver, operatively connected to the second transmission port of a last tunable optical bandpass filter BPF of the cascade of tunable optical bandpass filters BPFs to receive the second optical signal and convert said second optical signal into a respective second electrical signal;
wherein the electronic processing means are configured to determine a peak of transmission or reflection wavelength of the FBG sensor, in said wide range of wavelengths, based on the plurality of first electrical signals detected, and on the second electrical signal detected.

16. The system of claim 8, further comprising an optical band splitter, arranged upstream of the tunable optical bandpass filter BPF, and a third opto-electronic receiver, wherein the optical band splitter is configured to split the total optical power and send a part thereof to the third opto-electronic receiver, and wherein the third opto-electronic receiver is configured to obtain a third electrical signal adapted to support a further compensation.

17. The system of claim 16, wherein each of said first opto-electronic receiver, second opto-electronic receiver, third opto-electronic receiver comprises at least one respective semiconductor photodiode configured to detect and convert optical signals, at the wavelengths considered, into electrical signals.

18. The system of claim 8, further comprising an optical circulator having a first port connected to the broadband optical radiation source, a second port connected to an optical fiber containing the FBG sensor, and a third port connected to the at least one tunable optical bandpass filter BPF, wherein the optical circulator is configured to transmit the broadband excitation optical radiation, received from the first port, to the optical fiber containing the FBG sensor, through the second port, and is further configured to transmit the spectrum reflected by the FBG sensor, received from the second port, to the at least one tunable optical bandpass filter BPF, through the third port.

19. The system of claim 18, wherein said optical circulator is integrated into said PIC.

20. The system of claim 8, comprising:
a plurality of FBG sensors in cascade, each FBG sensor having a respective nominal operating wavelength;
a Coarse wavelength division demultiplexer (CWDM), configured to demultiplex the spectrum transmitted or reflected by the plurality of optical FBG sensors, and provide each of the optical signals with a different wavelength on a respective i-th output port;
a respective plurality of tunable optical bandpass filters BPFs, each connected to an output of the CWDM to receive a respective optical signal at a respective operating wavelength, each being tunable around said respective operating wavelength corresponding to a respective one of the nominal operating wavelengths of the FBG sensors;

a plurality of first opto-electronic receivers, configured to receive a plurality of first optical signals and convert said plurality of first optical signals into a respective plurality of first electrical signals; and a plurality of second opto-electronic receivers, each of which is operatively connected to the second transmission port of a respective i-th tunable optical bandpass filter BPF connected to a respective i-th output of the CWDM to receive a respective second optical signal and convert said respective second optical into a respective second electrical signal;

wherein the electronic processing means are configured to determine the wavelength shift, with respect to the nominal operating wavelength, of each spectrum transmitted or reflected by each FBG sensor, based on the plurality of first electrical signals detected, and on the second electrical signal.

21. The system of claim 8, wherein each FBG sensor is configured to detect a stain acting in a position where the FBG sensor is.

22. The system of claim 21, wherein the FBG is configured to operate within a brake pad or incorporated in or coupled with a brake caliper, or incorporated in a washer device configured to be arranged between a brake caliper support and a brake caliper, and wherein at least one strain detected by the at least one FBG sensor is representative of a tightening force and/or braking torque acting on the brake caliper.

* * * * *